US012681166B2

(12) United States Patent
Wang et al.

(10) Patent No.: US 12,681,166 B2
(45) Date of Patent: Jul. 14, 2026

(54) PHASE-BASED RANGING METHOD AND RELATED APPARATUS

(71) Applicant: HUAWEI TECHNOLOGIES CO., LTD., Shenzhen (CN)

(72) Inventors: Wei Wang, Singapore (SG); Heng Zhang, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 214 days.

(21) Appl. No.: 18/777,814

(22) Filed: Jul. 19, 2024

(65) Prior Publication Data

US 2024/0369696 A1      Nov. 7, 2024

Related U.S. Application Data

(63) Continuation of application No. PCT/CN2022/136845, filed on Dec. 6, 2022.

(30) Foreign Application Priority Data

Jan. 21, 2022     (CN) ......................... 202210074767.3

(51) Int. Cl.
*G01S 13/84*          (2006.01)
(52) U.S. Cl.
CPC ..................................... *G01S 13/84* (2013.01)
(58) Field of Classification Search
CPC ........ G01S 11/02; G01S 13/74; G01S 13/765; G01S 13/84
See application file for complete search history.

(56) References Cited

U.S. PATENT DOCUMENTS

| | | | |
|---|---|---|---|
| 2019/0253301 A1* | 8/2019 | Hadaschik | ............... G01S 5/14 |
| 2020/0166631 A1 | 5/2020 | Tong et al. | |
| 2022/0066019 A1* | 3/2022 | Waheed | .................. G01S 13/84 |

FOREIGN PATENT DOCUMENTS

| | | |
|---|---|---|
| CN | 1707980 A | 12/2005 |
| CN | 101304263 A | 11/2008 |
| CN | 102045889 A | 5/2011 |
| CN | 104660302 A | 5/2015 |

OTHER PUBLICATIONS

Wolfram Kluge et al, "System, method, and circuit for distance measurement between two nodes of a radio network," patent by Atmel, 2014, total 13 pages.

(Continued)

*Primary Examiner* — Timothy A Brainard

(57)          ABSTRACT

A phase-based ranging method and a related apparatus are disclosed. The ranging method includes: receiving a first multi-tone signal sent by a second transceiver, where the first multi-tone signal includes N first single-frequency signals, the N first single-frequency signals are obtained through negotiation between a first transceiver and the second transceiver, and N is an integer greater than 1; performing down conversion on the first multi-tone signal based on each of the N first single-frequency signals to obtain N direct current (DC) signals, where each of the N first single-frequency signals corresponds to one of the N DC signals; and measuring a first phase of each of the N DC signals to obtain a first phase value sequence.

19 Claims, 14 Drawing Sheets

(56) References Cited

OTHER PUBLICATIONS

Y. Schroder, D. Reimers, and L. Wolf, "Accurate and precise distance estimation from phase-based ranging data", IPIN, Sep. 24-27, 2018, total 8 pages.
P. Zand, A. Duzen, J. Romme, J. Govers, C. Bachmann, and K. Philips, "A high-accuracy concurrent phase-based ranging for large-scale dense BLE network" , PIMRC ,2019, total 7 pages.
E. Bechthum et al, "A Low-Power BLE Transceiver with Support for Phase-Based Ranging, Featuring 5µs PLL Locking Time and 5.3ms Ranging Time, Enabled by Staircase-Chirp PLL with Sticky-Lock Channel-Switching", ISSCC, Feb. 19, 2020, total 3 pages.

* cited by examiner

Baseband signal
obtained through
down conversion

DC signal

Second transceiver            First transceiver

First transceiver 60

| Radio frequency transceiver circuit 601 | Baseband processor 602 | Central processing unit 603 |
| --- | --- | --- |

Second transceiver 70

| Radio frequency transceiver circuit 701 | Baseband processor 702 |
| --- | --- |

PHASE-BASED RANGING METHOD AND RELATED APPARATUS

CROSS-REFERENCE TO RELATED APPLICATION

This application is a continuation of International Application No. PCT/CN2022/136845, filed on Dec. 6, 2022, which claims priority to Chinese Patent Application No. 202210074767.3, filed on Jan. 21, 2022. The disclosures of the aforementioned applications are incorporated herein by reference in their entireties.

TECHNICAL FIELD

This application relates to the field of communication technologies, and in particular, to a phase-based ranging method and a related apparatus.

BACKGROUND

With the arrival of the Internet of everything era, low-power narrowband wireless technologies (such as Bluetooth and ZigBee) are increasingly widely used in daily life. Compared with other wireless technologies such as 5G and Wi-Fi, the low-power narrowband wireless technologies have the following advantages: quite low power consumption, which means longer usage time of a device; and a simpler design, so that device costs are lower. Therefore, the low-power narrowband wireless technologies are not only widely used in terminal devices (such as a mobile phone, a wearable device, and a smart home appliance), but also widely used in the industrial Internet of things (IIoT).

Currently, in addition to conventional device connection functions, the low-power narrowband wireless technologies further have a function of measuring a distance between devices, and may be used to implement device positioning. Other wireless technologies (such as an ultra-wideband UWB technology and Wi-Fi FTM) generally implement a ranging function by measuring the time of flight (ToF) of a signal. However, because bandwidth in the low-power narrowband wireless technologies is narrow (for example, 2 MHz or narrower), the ToF measurement accuracy of the low-power narrowband wireless technologies is poor.

Therefore, how to provide a ranging method to improve the efficiency of phase-based ranging and measurement accuracy is an urgent problem that needs to be solved.

SUMMARY

Embodiments of this application provide a phase-based ranging method and a related apparatus, to improve the efficiency of phase-based ranging and improve measurement accuracy during device movement.

According to a first aspect, an embodiment of this application provides a phase-based ranging method, applied to a first transceiver. The method includes: receiving a first multi-tone signal sent by a second transceiver, where the first multi-tone signal includes N first single-frequency signals, the N first single-frequency signals are signals obtained through negotiation between the first transceiver and the second transceiver, and N is an integer greater than 1; performing down conversion on the first multi-tone signal based on each of the N first single-frequency signals to obtain N direct current DC signals, where each first single-frequency signal corresponds to one DC signal; and measuring a first phase of each of the N DC signals to obtain a first phase value sequence, where the first phase includes a phase shift value generated during transmission of a first single-frequency signal corresponding to each DC signal from the second transceiver to the first transceiver, the first phase value sequence includes the first phase of each of the N DC signals, and the first phase value sequence is used to calculate a distance between the first transceiver and the second transceiver.

During phase-based ranging in this embodiment, devices interact with each other by using a multi-tone signal, so that phase measurement for a plurality of frequencies can be implemented through one round of interaction. This improves efficiency of phase-based ranging. Before ranging, two devices may first negotiate on a plurality of single-frequency signals (corresponding to a plurality of frequencies) included in a multi-tone signal, and then a receiving device performs down conversion on the multi-tone signal based on each of the plurality of single-frequency signals to measure a phase shift value generated during transmission of a signal corresponding to each frequency from a sending device to the receiving device, so that a distance between the devices is calculated based on the phase shift value of the signal corresponding to each of the plurality of frequencies. However, during phase-based ranging in the conventional technology, devices interact with each other by using a single-frequency signal (namely, a single-carrier signal), and phase measurement for only one frequency can be implemented through one round of interaction. To implement phase measurement for a plurality of frequencies, the devices need to perform a plurality of rounds of interaction. Because the devices need to perform a plurality of rounds of interaction to complete phase-based ranging, power consumption of the devices is high, and for a mobile device, high power consumption leads to shorter usage time of the device. In addition, positioning time is long, and ranging takes quite a long time. This means a quite low refresh rate of ranging and positioning. If a device moves, a location obtained through positioning greatly deviates from an actual location. In addition, difficulty of coexistent scheduling on a device increases. For a device (for example, a mobile phone) on which a plurality of wireless technologies coexists, the wireless technologies are usually scheduled in a coexistent manner through TDMA. If one of the wireless technologies takes excessive time, sending/receiving occasions of other wireless technologies are reduced. In this embodiment, an existing single-frequency-signal-based interaction mode is replaced with a multi-tone-signal-based interaction mode, so that a quantity of times of signal interaction for ranging can be reduced. For example, if a quantity of frequencies in a multi-tone signal is N, in this embodiment, a quantity of times of signal interaction can be reduced to 1/N of a quantity of times in the conventional technology. In this way, power consumption of devices is reduced, and a distance between devices can be determined within a shorter time, so that efficiency of phase-based ranging and accuracy of ranging during movement of a device are improved.

In a possible implementation, the method further includes: generating a second multi-tone signal based on the N first single-frequency signals; and sending the second multi-tone signal to the second transceiver, where the second multi-tone signal is used by the second transceiver to obtain a second phase value sequence, the second phase value sequence includes a phase shift value generated during transmission of each of the N first single-frequency signals from the first transceiver to the second transceiver, and the first phase value sequence, together with the second phase value sequence, is used to calculate the distance between the first transceiver and the second transceiver.

In this embodiment, it is quite difficult to implement phase synchronization between two wirelessly connected devices during actual use. Consequently, there is an error between each measured first phase shift value and an actual phase shift value generated during transmission of a signal from the second transceiver to the first transceiver. The error occurs because initial phases of the two devices cannot cancel each other. Therefore, to eliminate impact of the initial phases of the two devices, the devices may send signals to each other and perform phase measurement (to be specific, two-way phase measurement). It should be noted that the initial phases of the two devices should remain unchanged in a process in which the devices send signals to each other. After the first transceiver, as a receiving device, receives a multi-tone signal sent by the second transceiver and obtains a first phase value sequence based on the multi-tone signal, when it is ensured that initial phases of the first transceiver and the second transceiver remain unchanged, the first transceiver may become a sending device and send, to the second transceiver, a multi-tone signal including a same frequency, to implement the two-way phase measurement, eliminate the impact of the initial phases of the two devices, and improve the accuracy of phase-based ranging.

In a possible implementation, the performing down conversion on the first multi-tone signal based on each of the N first single-frequency signals to obtain N direct current (DC) signals includes: generating N first radio frequency local oscillator signals based on N first frequencies corresponding to the N first single-frequency signals, where each first radio frequency local oscillator signal corresponds to one first frequency; and performing down conversion on the first multi-tone signal based on each of the N first radio frequency local oscillator signals to obtain the N DC signals.

In this embodiment, when the first transceiver includes N RFLOs, each RFLO may generate a radio frequency local oscillator signal based on a frequency corresponding to a single-frequency signal, perform down conversion on the multi-tone signal to obtain a DC signal corresponding to the single-frequency signal, and may further measure a phase of the DC signal to obtain a phase shift value generated during transmission of the single-frequency signal from the second transceiver to the first transceiver. Because the N RFLOs operate in parallel, the N DC signals can be obtained more quickly, so that the efficiency of phase-based ranging is improved.

In a possible implementation, the performing down conversion on the first multi-tone signal based on each of the N first single-frequency signals to obtain N first direct current DC signals includes: generating a second radio frequency local oscillator signal and N first digital local oscillator signals based on N first frequencies corresponding to the N first single-frequency signals, where a sum of N second frequencies corresponding to the N first digital local oscillator signals and a preset frequency corresponding to the second radio frequency local oscillator signal is equal to the N first frequencies; and performing down conversion on the first multi-tone signal based on the second radio frequency local oscillator signal and the N first digital local oscillator signals to obtain the N DC signals.

In this embodiment, the N first frequencies corresponding to the N single-frequency signals are $f_1$, $f_2$, . . . , $f_N$, the second radio frequency local oscillator signal is a signal generated by an RFLO based on the preset frequency $f_c$, and the N first digital local oscillator signals are signals generated by N digital LOs based on $f_1$-$f_c$, $f_2$-$f_c$, . . . , $f_N$-$f_c$. Down conversion can be performed on the first multi-tone signal $F(f_1, f_2, . . . , f_N)$ based on the second radio frequency local oscillator signal and each of the N first digital local oscillator signals to obtain the N DC signals: $F_1(0)$, $F_2(0)$, . . . , and $F_N(0)$. In the method provided in this embodiment, a transceiver needs to include only one RFLO, and a quantity of RFLOs does not need to be consistent with a quantity of frequencies included in a multi-tone signal. This avoids an increase in RF circuit costs, an increase in power consumption, and an increase in an area that are caused by a plurality of RFLOs, and therefore reduces ranging costs.

In a possible implementation, the performing down conversion on the first multi-tone signal based on the second radio frequency local oscillator signal and the N first digital local oscillator signals to obtain the N DC signals includes: performing down conversion on the first multi-tone signal based on the second radio frequency local oscillator signal to obtain a first baseband signal, where the first baseband signal is a signal obtained by performing spectrum shifting on the first multi-tone signal based on the preset frequency; and performing digital down conversion on the first baseband signal based on each of the N first digital local oscillator signals to obtain the N DC signals.

In this embodiment, when receiving a multi-tone signal, a device may first perform down conversion on the multi-tone signal by using an RFLO to convert the multi-tone signal into a baseband signal, then provide the baseband signal for each digital LO to perform digital down conversion to convert a signal corresponding to each digital LO frequency into a DC signal, and then perform phase measurement. In the method provided in this embodiment, a transceiver needs to include only one RFLO, and a quantity of RFLOs does not need to be consistent with a quantity of frequencies included in a multi-tone signal. This avoids an increase in RF circuit costs, an increase in power consumption, and an increase in an area that are caused by a plurality of RFLOs, and therefore reduces ranging costs.

In a possible implementation, the generating a second multi-tone signal based on the N first single-frequency signals includes: adding up the N first digital local oscillator signals to obtain a second baseband signal; and performing up conversion on the second baseband signal based on the second radio frequency local oscillator signal to obtain the second multi-tone signal.

In this embodiment, to eliminate the impact of initial phases of the first transceiver and the second transceiver, it needs to be ensured that an initial phase of an LO in a case in which the first transceiver performs down conversion is the same as an initial phase of an LO in a case in which the first transceiver sends a multi-tone signal. Therefore, when generating the second multi-tone signal, the first transceiver may obtain the second multi-tone signal based on digital local oscillator signals generated by the N digital LOs and a radio frequency local oscillator signal generated by the RFLO, to eliminate impact of the initial phases through two-way phase measurement. This improves accuracy of phase-based ranging.

In a possible implementation, the method further includes: determining time of flight of a signal between the first transceiver and the second transceiver based on the first phase value sequence and the second phase value sequence; and determining the distance between the first transceiver and the second transceiver based on the time of flight.

In this embodiment, the time of flight of the signal is calculated based on a phase shift value generated during transmission of a signal from the second transceiver to the first transceiver and a phase shift value generated during transmission of a signal from the first transceiver to the second transceiver. This avoids a problem that a calculated value of the time of flight of the signal greatly deviates from an actual value of the time of flight of the signal due to impact of initial phases of the first transceiver and the second transceiver, and therefore improves accuracy of phase-based ranging.

In a possible implementation, the method further includes: performing a handshake procedure with the second transceiver to obtain, through negotiation, the N first single-frequency signals used during phase-based ranging.

In this embodiment, before ranging is performed between the first transceiver and the second transceiver, the two devices may predetermine a specific frequency of a multi-tone signal through negotiation, to be specific, may first determine the N single-frequency signals through negotiation, and then may obtain, based on the N single-frequency signals, a multi-tone signal used during phase-based ranging, so that the distance between the devices can be calculated more quickly. This improves efficiency of phase-based ranging and accuracy of measurement during movement of a device.

In a possible implementation, the method further includes: receiving a carrier signal sent by the second transceiver, where the carrier signal is a single-frequency signal; and determining a frequency deviation between the first transceiver and the second transceiver based on the carrier signal, where the frequency deviation is used to calibrate a frequency offset between the first transceiver and the second transceiver.

In this embodiment, the frequency offset (CFO) between the first transceiver and the second transceiver affects accuracy of phase measurement. Therefore, before the two devices perform multi-tone-signal-based interaction, the second transceiver may send a carrier signal to the first transceiver at a specific frequency, and the first transceiver estimates and compensates for the CFO, so that the CFO between the two devices is close to zero. This improves measurement accuracy.

According to a second aspect, an embodiment of this application provides a phase-based ranging method, applied to a second transceiver. The method includes: generating a first multi-tone signal based on N first single-frequency signals, where the N first single-frequency signals are signals obtained through negotiation between a first transceiver and the second transceiver, and N is an integer greater than 1; and sending the first multi-tone signal to the first transceiver, where the first multi-tone signal is used by the first transceiver to obtain a first phase value sequence, the first phase value sequence includes a phase shift value generated during transmission of each of the N first single-frequency signals from the second transceiver to the first transceiver, and the first phase value sequence is used to calculate a distance between the first transceiver and the second transceiver.

During phase-based ranging in this embodiment, devices interact with each other by using a multi-tone signal, so that phase measurement for a plurality of frequencies can be implemented through one round of interaction. Specifically, before ranging, two devices may first negotiate on a plurality of single-frequency signals (corresponding to a plurality of frequencies) included in a multi-tone signal, a sending device may send the multi-tone signal to a receiving device, and then the receiving device may perform down conversion on the multi-tone signal based on each of the plurality of single-frequency signals, measure a phase shift value generated during transmission of a signal corresponding to each frequency from a sending device to the receiving device, and then calculate a distance between the devices based on the phase shift value of the signal corresponding to each of the plurality of frequencies. However, during phase-based ranging in the conventional technology, devices interact with each other by using a single-frequency signal (namely, a single-carrier signal), and phase measurement for only one frequency can be implemented through one round of interaction. To implement phase measurement for a plurality of frequencies, the devices need to perform a plurality of rounds of interaction. In this embodiment, an existing single-frequency-signal-based interaction mode is replaced with a multi-tone-signal-based interaction mode, so that a quantity of times of signal interaction for ranging can be reduced. For example, if a quantity of frequencies in a multi-tone signal is N, in this embodiment, a quantity of times of signal interaction can be reduced to 1/N of a quantity of times in the conventional technology. In this way, power consumption of devices is reduced, and a distance between devices can be determined within a shorter time, so that efficiency of phase-based ranging and accuracy of ranging during movement of a device are improved.

In a possible implementation, the generating a first multi-tone signal based on N first single-frequency signals includes: generating a first radio frequency local oscillator signal and N first digital local oscillator signals based on N first frequencies corresponding to the N first single-frequency signals, where a sum of N second frequencies corresponding to the N first digital local oscillator signals and a preset frequency corresponding to the first radio frequency local oscillator signal is equal to the N first frequencies; adding up the N first digital local oscillator signals to obtain a first baseband signal; and performing up conversion on the first baseband signal based on the first radio frequency local oscillator signal to obtain the first multi-tone signal.

In this embodiment, during generation of a multi-tone signal, signals generated by a plurality of digital LOs may be added up as a baseband signal, and an RFLO performs up conversion on the baseband signal to convert the baseband signal into a multi-tone signal, and then sends the multi-tone signal through an antenna. In the method provided in this embodiment, a transceiver needs to include only one RFLO, and a quantity of RFLOs does not need to be consistent with a quantity of frequencies included in a multi-tone signal. This avoids an increase in RF circuit costs, an increase in power consumption, and an increase in an area that are caused by a plurality of RFLOs, and therefore reduces ranging costs.

In a possible implementation, the method further includes: receiving a second multi-tone signal sent by the first transceiver, where the second multi-tone signal includes the N first single-frequency signals; performing down conversion on the second multi-tone signal based on each of the N first single-frequency signals to obtain N direct current DC signals, where each first single-frequency signal corresponds to one DC signal; and measuring a second phase of each of the N DC signals to obtain a second phase value sequence, where the second phase includes a phase shift value generated during transmission of a first single-frequency signal corresponding to each DC signal from the first transceiver to the second transceiver, the second phase value sequence includes the second phase of each of the N DC signals, and the first phase value sequence, together with the second phase value sequence, is used to calculate the distance between the first transceiver and the second transceiver.

In this embodiment, it is quite difficult to implement phase synchronization between two wirelessly connected devices during actual use. Consequently, there is an error between each phase shift value measured by the first transceiver and an actual phase shift value generated during transmission of a signal from the second transceiver to the first transceiver. The error occurs because initial phases of the two devices cannot cancel each other. Therefore, to eliminate impact of the initial phases of the two devices, the devices may send signals to each other and perform phase measurement (to be specific, two-way phase measurement). It should be noted that the initial phases of the two devices should remain unchanged in a process in which the devices send signals to each other. Specifically, after the first transceiver, as a receiving device, receives a multi-tone signal sent by the second transceiver and obtains a first phase value sequence based on the multi-tone signal, when it is ensured that initial phases of the first transceiver and the second transceiver remain unchanged, the first transceiver may become a sending device and send, to the second transceiver, a multi-tone signal including a same frequency. The second transceiver receives the multi-tone signal and performs phase measurement to implement the two-way phase measurement, eliminate impact of the initial phases of the two devices, and improve accuracy of phase-based ranging.

In a possible implementation, higher bandwidth of an interfered-with frequency band of a channel between the first transceiver and the second transceiver indicates a smaller quantity N of first single-frequency signals included in the first multi-tone signal.

In this embodiment, during multi-tone-signal-based interaction, a device may adjust a quantity N of frequencies in the multi-tone signal based on a status of interference between adjacent channels. For example, when there is interference between adjacent channels, a small N may be used to avoid impact of the interference; or when there is no interference between adjacent channels, a large N may be used to complete ranging more quickly.

In a possible implementation, the method further includes: sending L first multi-tone signals to the first transceiver to obtain L first phase value sequences, where L is an integer greater than 1, and N first frequencies corresponding to each of the L first multi-tone signals are different from each other; and receiving L second multi-tone signals sent by the first transceiver to obtain L second phase value sequences, where the L first phase shift value sequences, together with the L second phase shift value sequences, are used to calculate the distance between the first transceiver and the second transceiver.

In this embodiment, during interaction between the first transceiver and the second transceiver, the first transceiver may send a plurality of multi-tone signals to the second transceiver at a time, so that phase-based ranging can be performed based on more frequencies to improve measurement accuracy.

According to a third aspect, an embodiment of this application provides a phase-based ranging system, including: a first transceiver, configured to send a first multi-tone signal to M second transceivers, where the first multi-tone signal includes N single-frequency signals, the N first single-frequency signals are signals obtained through negotiation between the first transceiver and the M second transceivers, and N and M are integers greater than 1; each of the M second transceivers, configured to: perform down conversion on the first multi-tone signal based on each of the N first single-frequency signals to obtain N direct current DC signals, where each first single-frequency signal corresponds to one DC signal; and measure a first phase of each of the N DC signals to obtain a first phase value sequence, where the first phase includes a phase shift value generated during transmission of a first single-frequency signal corresponding to each DC signal from the second transceiver to the first transceiver, and the first phase value sequence includes the first phase of each of the N DC signals; and a computing device, configured to calculate a distance between the first transceiver and each second transceiver based on each of the M first phase value sequences.

In this embodiment, in a scenario in which a plurality of devices perform mutual ranging (namely, many-to-many ranging), the devices may be enabled to send multi-tone signals in turn based on a broadcast attribute of a radio signal. When a device sends a signal, other devices simultaneously receive the signal and measure a phase at each frequency in the multi-tone signal. Further, a distance between devices can be calculated based on a phase at each frequency. Compared with one-to-one ranging performed between devices in turn, in the many-to-many ranging mode, a quantity of times of signal transmission can be reduced, to improve ranging efficiency and accuracy of measurement during movement of a device.

According to a fourth aspect, an embodiment of this application provides a first transceiver, including: a radio frequency transceiver circuit, configured to receive a first multi-tone signal sent by a second transceiver, where the first multi-tone signal includes N first single-frequency signals, the N first single-frequency signals are signals obtained through negotiation between the first transceiver and the second transceiver, and N is an integer greater than 1; and a baseband processor, configured to perform down conversion on the first multi-tone signal based on each of the N first single-frequency signals to obtain N direct current DC signals, where each first single-frequency signal corresponds to one DC signal. The baseband processor is further configured to measure a first phase of each of the N DC signals to obtain a first phase value sequence, where the first phase includes a phase shift value generated during transmission of a first single-frequency signal corresponding to each DC signal from the second transceiver to the first transceiver, the first phase value sequence includes the first phase of each of the N DC signals, and the first phase value sequence is used to calculate a distance between the first transceiver and the second transceiver.

In a possible implementation, the baseband processor is further configured to generate a second multi-tone signal based on the N first single-frequency signals; and the baseband processor is further configured to send the second multi-tone signal to the second transceiver, where the second multi-tone signal is used by the second transceiver to obtain a second phase value sequence, the second phase value sequence includes a phase shift value generated during transmission of each of the N first single-frequency signals from the first transceiver to the second transceiver, and the first phase value sequence, together with the second phase value sequence, is used to calculate the distance between the first transceiver and the second transceiver.

In a possible implementation, the baseband processor is further configured to: generate N first radio frequency local oscillator signals based on N first frequencies corresponding to the N first single-frequency signals, where each first radio frequency local oscillator signal corresponds to one first frequency; and perform down conversion on the first multi-tone signal based on each of the N first radio frequency local oscillator signals to obtain the N DC signals.

In a possible implementation, the baseband processor is further configured to: generate a second radio frequency local oscillator signal and N first digital local oscillator signals based on N first frequencies corresponding to the N first single-frequency signals, where a sum of N second frequencies corresponding to the N first digital local oscillator signals and a preset frequency corresponding to the second radio frequency local oscillator signal is equal to the N first frequencies; and perform down conversion on the first multi-tone signal based on the second radio frequency local oscillator signal and the N first digital local oscillator signals to obtain the N DC signals.

In a possible implementation, the baseband processor is further configured to: perform down conversion on the first multi-tone signal based on the second radio frequency local oscillator signal to obtain a first baseband signal, where the first baseband signal is a signal obtained by performing spectrum shifting on the first multi-tone signal based on the preset frequency; and perform digital down conversion on the first baseband signal based on each of the N first digital local oscillator signals to obtain the N DC signals.

In a possible implementation, the baseband processor is further configured to add up the N first digital local oscillator signals to obtain a second baseband signal, and perform up conversion on the second baseband signal based on the second radio frequency local oscillator signal to obtain the second multi-tone signal.

In a possible implementation, the apparatus further includes a central processing unit, configured to determine time of flight of a signal between the first transceiver and the second transceiver based on the first phase value sequence and the second phase value sequence, and determine the distance between the first transceiver and the second transceiver based on the time of flight.

In a possible implementation, the radio frequency transceiver circuit is further configured to receive a carrier signal sent by the second transceiver, where the carrier signal is a single-frequency signal; and the baseband processor is further configured to determine a frequency deviation between the first transceiver and the second transceiver based on the carrier signal, where the frequency deviation is used to calibrate a frequency offset between the first transceiver and the second transceiver.

According to a fifth aspect, an embodiment of this application provides a second transceiver. The apparatus includes: a baseband processor, configured to generate a first multi-tone signal based on N first single-frequency signals, where the N first single-frequency signals are signals obtained through negotiation between a first transceiver and the second transceiver, and N is an integer greater than 1; and a radio frequency transceiver circuit, configured to send the first multi-tone signal to the first transceiver, where the first multi-tone signal is used by the first transceiver to obtain a first phase value sequence, the first phase value sequence includes a phase shift value generated during transmission of each of the N first single-frequency signals from the second transceiver to the first transceiver, and the first phase value sequence is used to calculate a distance between the first transceiver and the second transceiver.

In a possible implementation, the baseband processor is further configured to: generate a first radio frequency local oscillator signal and N first digital local oscillator signals based on N first frequencies corresponding to the N first single-frequency signals, where a sum of N second frequencies corresponding to the N first digital local oscillator signals and a preset frequency corresponding to the first radio frequency local oscillator signal is equal to the N first frequencies; add up the N first digital local oscillator signals to obtain a first baseband signal; and perform up conversion on the first baseband signal based on the first radio frequency local oscillator signal to obtain the first multi-tone signal.

In a possible implementation, the radio frequency transceiver circuit is further configured to receive a second multi-tone signal sent by the first transceiver, where the second multi-tone signal includes the N first single-frequency signals; the baseband processor is further configured to perform down conversion on the second multi-tone signal based on each of the N first single-frequency signals to obtain N direct current DC signals, where each first single-frequency signal corresponds to one DC signal; and the baseband processor is further configured to measure a second phase of each of the N DC signals to obtain a second phase value sequence, where the second phase includes a phase shift value generated during transmission of a first single-frequency signal corresponding to each DC signal from the first transceiver to the second transceiver, the second phase value sequence includes the second phase of each of the N DC signals, and the first phase value sequence, together with the second phase value sequence, is used to calculate the distance between the first transceiver and the second transceiver.

In a possible implementation, the radio frequency transceiver circuit is further configured to: send L first multi-tone signals to the first transceiver to obtain L first phase value sequences, where N first frequencies corresponding to each of the L first multi-tone signals are different from each other, and L is an integer greater than 1; and receive L second multi-tone signals sent by the first transceiver to obtain L second phase value sequences, where the L first phase shift value sequences, together with the L second phase shift value sequences, are used to calculate the distance between the first transceiver and the second transceiver.

According to a sixth aspect, an embodiment of this application provides a first phase-based ranging apparatus. The apparatus includes: a first receiving unit, configured to receive a first multi-tone signal sent by a second phase-based ranging apparatus, where the first multi-tone signal includes N first single-frequency signals, the N first single-frequency signals are signals obtained through negotiation between the first phase-based ranging apparatus and the second phase-based ranging apparatus, and N is an integer greater than 1; a first processing unit, configured to perform down conversion on the first multi-tone signal based on each of the N first single-frequency signals to obtain N direct current DC signals, where each first single-frequency signal corresponds to one DC signal; and a first measurement unit, configured to measure a first phase of each of the N DC signals to obtain a first phase value sequence, where the first phase includes a phase shift value generated during transmission of a first single-frequency signal corresponding to each DC signal from the second phase-based ranging apparatus to the first phase-based ranging apparatus, the first phase value sequence includes the first phase of each of the N DC signals, and the first phase value sequence is used to calculate a distance between the first phase-based ranging apparatus and the second phase-based ranging apparatus.

In a possible implementation, the apparatus further includes: a second processing unit, configured to generate a second multi-tone signal based on the N first single-frequency signals; and a first sending unit, configured to send the second multi-tone signal to the second phase-based ranging apparatus, where the second multi-tone signal is used by the second phase-based ranging apparatus to obtain a second phase value sequence, the second phase value sequence includes a phase shift value generated during transmission of each of the N first single-frequency signals from the first phase-based ranging apparatus to the second phase-based ranging apparatus, and the first phase value sequence, together with the second phase value sequence, is used to calculate the distance between the first phase-based ranging apparatus and the second phase-based ranging apparatus.

In a possible implementation, the first processing unit is further configured to: generate N first radio frequency local oscillator signals based on N first frequencies corresponding to the N first single-frequency signals, where each first radio frequency local oscillator signal corresponds to one first frequency; and perform down conversion on the first multi-tone signal based on each of the N first radio frequency local oscillator signals to obtain the N DC signals.

In a possible implementation, the first processing unit is further configured to: generate a second radio frequency local oscillator signal and N first digital local oscillator signals based on N first frequencies corresponding to the N first single-frequency signals, where a sum of N second frequencies corresponding to the N first digital local oscillator signals and a preset frequency corresponding to the second radio frequency local oscillator signal is equal to the N first frequencies; and perform down conversion on the first multi-tone signal based on the second radio frequency local oscillator signal and the N first digital local oscillator signals to obtain the N DC signals.

In a possible implementation, the first processing unit is further configured to: perform down conversion on the first multi-tone signal based on the second radio frequency local oscillator signal to obtain a first baseband signal, where the first baseband signal is a signal obtained by performing spectrum shifting on the first multi-tone signal based on the preset frequency; and perform digital down conversion on the first baseband signal based on each of the N first digital local oscillator signals to obtain the N DC signals.

In a possible implementation, the second processing unit is further configured to add up the N first digital local oscillator signals to obtain a second baseband signal, and perform up conversion on the second baseband signal based on the second radio frequency local oscillator signal to obtain the second multi-tone signal.

In a possible implementation, the apparatus further includes a third processing unit, configured to determine time of flight of a signal between the first phase-based ranging apparatus and the second phase-based ranging apparatus based on the first phase value sequence and the second phase value sequence. The third processing unit is further configured to determine the distance between the first phase-based ranging apparatus and the second phase-based ranging apparatus based on the time of flight.

In a possible implementation, the apparatus further includes: a second receiving unit, configured to receive a carrier signal sent by the second phase-based ranging apparatus, where the carrier signal is a single-frequency signal; and a fourth processing unit, configured to determine a frequency deviation between the first phase-based ranging apparatus and the second phase-based ranging apparatus based on the carrier signal, where the frequency deviation is used to calibrate a frequency offset between the first phase-based ranging apparatus and the second phase-based ranging apparatus.

According to a seventh aspect, an embodiment of this application provides a second phase-based ranging apparatus. The apparatus includes: a first processing unit, configured to generate a first multi-tone signal based on N first single-frequency signals, where the N first single-frequency signals are signals obtained through negotiation between a first phase-based ranging apparatus and the second phase-based ranging apparatus, and N is an integer greater than 1; and a first sending unit, configured to send the first multi-tone signal to the first phase-based ranging apparatus, where the first multi-tone signal is used by the first phase-based ranging apparatus to obtain a first phase value sequence, the first phase value sequence includes a phase shift value generated during transmission of each of the N first single-frequency signals from the second phase-based ranging apparatus to the first phase-based ranging apparatus, and the first phase value sequence is used to calculate a distance between the first phase-based ranging apparatus and the second phase-based ranging apparatus.

In a possible implementation, the first processing unit is further configured to: generate a first radio frequency local oscillator signal and N first digital local oscillator signals based on N first frequencies corresponding to the N first single-frequency signals, where a sum of N second frequencies corresponding to the N first digital local oscillator signals and a preset frequency corresponding to the first radio frequency local oscillator signal is equal to the N first frequencies; add up the N first digital local oscillator signals to obtain a first baseband signal; and perform up conversion on the first baseband signal based on the first radio frequency local oscillator signal to obtain the first multi-tone signal.

In a possible implementation, the apparatus further includes: a first receiving unit, configured to receive a second multi-tone signal sent by the first phase-based ranging apparatus, where the second multi-tone signal includes the N first single-frequency signals; a second processing unit, configured to perform down conversion on the second multi-tone signal based on each of the N first single-frequency signals to obtain N direct current DC signals, where each first single-frequency signal corresponds to one DC signal; and a first measurement unit, configured to measure a second phase of each of the N DC signals to obtain a second phase value sequence, where the second phase includes a phase shift value generated during transmission of a first single-frequency signal corresponding to each DC signal from the first phase-based ranging apparatus to the second phase-based ranging apparatus, the second phase value sequence includes the second phase of each of the N DC signals, and the first phase value sequence, together with the second phase value sequence, is used to calculate the distance between the first phase-based ranging apparatus and the second phase-based ranging apparatus.

In a possible implementation, the apparatus further includes: a second sending unit, configured to send L first multi-tone signals to the first phase-based ranging apparatus to obtain L first phase value sequences, where L is an integer greater than 1, and N first frequencies corresponding to each of the L first multi-tone signals are different from each other; and a second receiving unit, configured to receive L second multi-tone signals sent by the first phase-based ranging apparatus to obtain L second phase value sequences, where the L first phase shift value sequences, together with the L second phase shift value sequences, are used to calculate the distance between the first phase-based ranging apparatus and the second phase-based ranging apparatus.

According to an eighth aspect, an embodiment of this application provides an electronic device, including a processor, a memory, and a communication interface. The memory is configured to store information transmission program code. The processor is configured to invoke the phase-based ranging method program code to perform the method according to any one of the implementations of the first aspect.

According to a ninth aspect, an embodiment of this application provides an electronic device, including a processor, a memory, and a communication interface. The memory is configured to store information transmission program code. The processor is configured to invoke the phase-based ranging method program code to perform the method according to any one of the implementations of the second aspect.

According to a tenth aspect, this application provides a chip system. The chip system includes at least one processor, a memory, and an interface circuit. The memory, the interface circuit, and the at least one processor are interconnected through a line. The at least one memory stores instructions. When the instructions are executed by the processor, the method according to any one of the implementations of the first aspect is implemented.

According to an eleventh aspect, this application provides a chip system. The chip system includes at least one processor, a memory, and an interface circuit. The memory, the interface circuit, and the at least one processor are interconnected through a line. The at least one memory stores instructions. When the instructions are executed by the processor, the method according to any one of the implementations of the second aspect is implemented.

According to a twelfth aspect, an embodiment of this application provides a computer storage medium. The computer storage medium stores a computer program. When the computer program is executed by a processor, the method according to any one of the implementations of the first aspect is implemented.

According to a thirteenth aspect, an embodiment of this application provides a computer storage medium. The computer storage medium stores a computer program. When the computer program is executed by a processor, the method according to any one of the implementations of the second aspect is implemented.

According to a fourteenth aspect, this application provides a computer program. The computer program includes instructions. When the computer program is executed by a computer, the computer is enabled to perform the method according to any one of the implementations of the first aspect.

According to a fifteenth aspect, this application provides a computer program. The computer program includes instructions. When the computer program is executed by a computer, the computer is enabled to perform the method according to any one of the implementations of the second aspect.

DESCRIPTION OF EMBODIMENTS

Figure 1A:
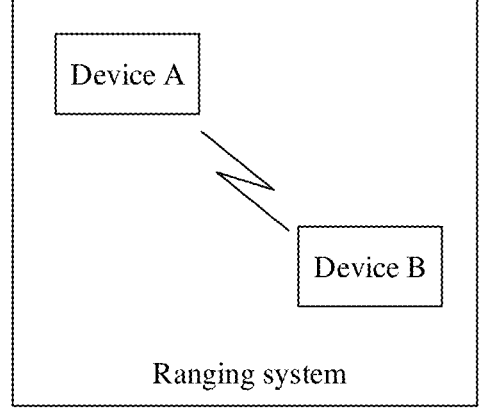
FIG. 1A is a diagram of a system architecture of an example ranging system according to an embodiment of this application.

The following describes embodiments of this application with reference to accompanying drawings in embodiments of this application.

In the specification, claims, and accompanying drawings of this application, the terms "first", "second", "third", "fourth", and the like are intended to distinguish between different objects but do not indicate a particular order. In addition, the terms "including", "having", and any variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification indicates that a particular feature, structure, or characteristic described with reference to the embodiment may be included in at least one embodiment of this application. The phrase appearing in various locations in this specification does not necessarily mean a same embodiment, and neither means an independent or alternative embodiment mutually exclusive with another embodiment. It is explicitly and implicitly understood by persons skilled in the art that embodiments described in this specification may be combined with another embodiment.

The terms "component", "module", and "system" and the like used in this specification indicate a computer-related entity, hardware, firmware, a combination of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside in a process and/or an execution thread, and a component may be located on one computer and/or distributed between two or more computers. In addition, these components may be executed from various computer-readable media that store various data structures. For example, the components may perform communication by using a local process and/or a remote process and based on, for example, a signal with one or more data packets (for example, data from two components interacting with another component in a local system, a distributed system, and/or across a network such as the Internet interacting with other systems by using the signal).

First, some terms in embodiments of this application are briefly described.

(1) Up conversion: a process of converting an input signal with a specific frequency into an output signal with a higher frequency (usually, information content and a modulation scheme of the signal are not changed). In a superheterodyne receiver, if a frequency of an intermediate-frequency signal obtained through frequency mixing is higher than a frequency of a raw signal, this frequency mixing mode is referred to as up conversion. Because an intermediate frequency obtained through frequency conversion is high, higher requirements are imposed on intermediate-frequency amplification, filtering, and demodulation in the receiver. Consequently, costs of the entire receiver are high. A quite high anti-image-interference capability and quite smooth frequency response in an entire frequency band can be achieved through up conversion.

(2) Down conversion: In a receiver, if a frequency of an intermediate-frequency signal obtained through frequency mixing is lower than a frequency of a raw signal, this frequency mixing mode is referred to as down conversion. Down conversion is intended to reduce a carrier frequency of a signal or directly remove a carrier frequency to obtain a baseband signal. In the down conversion mode, a circuit is simple, and costs are low. Therefore, down conversion is widely used in civil devices and military devices with a low performance requirement.

(3) Local oscillator (LO): actually a self-excited sine-wave oscillator for generating a mixed-frequency signal during up conversion or down conversion. For example, the local oscillator may generate a high-frequency equal-amplitude sine-wave signal whose frequency is higher than a frequency of a received signal by one intermediate frequency, and inject the oscillator signal into a mixer, to mix the oscillator signal with a high-frequency signal to obtain an intermediate-frequency signal.

(4) Phase-locked loop (PLL): a negative feedback control system in which a voltage generated through phase synchronization is used to tune a voltage-controlled oscillator (for example, a local oscillator) to generate a target frequency. According to a principle of automatic control, this is a typical feedback control circuit in which an external input reference signal is used to control a frequency and a phase of an internal oscillator signal in a loop, so that a frequency of an output signal automatically follows a frequency of an input signal. The PLL is usually used in a closed-loop tracking circuit. The PLL is a method for implementing a stable frequency in radio transmission, and mainly includes a VCO (voltage-controlled oscillator) and a PLL IC (phase-locked loop integrated circuit). The voltage-controlled oscillator provides a signal. A part of the signal is used as output, and a phase of the other part of the signal is compared, through frequency division, with a phase of a local oscillator signal generated by the PLL IC. To keep a frequency unchanged, a phase difference needs to remain unchanged. If the phase difference changes, a voltage at a voltage output end of the PLL IC changes to control the VCO until the phase difference is restored, to achieve an objective of phase locking. The phase-locked loop is a closed-loop electronic circuit that enables both a frequency and a phase of a controlled oscillator to remain in a determined relationship with an input signal.

(5) Time division multiplexing (Time Division Multiple Access, TDMA): Different time segments of one physical connection are used to transmit different signals to achieve multipath transmission. In time division multiplexing, time is used as a parameter for signal segmentation. Therefore, all signals need to be non-overlapping on a time axis. Time division multiplexing is to divide time provided for an entire channel for information transmission into several time slices (slots for short), and allocate these slots to each signal source for use.

(6) Time of flight (ToF): In a broad sense, a time of flight technology may be understood as a technology for measuring time taken by an object, a particle, or a wave to fly over a specific distance in a fixed medium (the medium, the distance, and the time are all known or measurable) to further interpret some properties of an ion or a medium. A ToF-based ranging method is a two-way ranging technology in which round-trip time of flight of a signal between two asynchronous transceivers is mainly used to measure a distance between nodes.

For ease of understanding technical solutions of this application, the following briefly describes a ranging system to which a ranging method provided in embodiments of this application is applicable.

FIG. 1A is a diagram of a system architecture of an example ranging system according to an embodiment of this application. The ranging system includes at least two devices, and different devices may be wirelessly connected. In FIG. 1A, two devices are used as an example: a device A and a device B. When either of the device A and the device B serves as a receiving device, the other device serves as a transmitting device. The transmitting device is configured to send a radio signal (in this embodiment, the signal is a multi-tone signal, and a multi-tone signal includes a plurality of frequencies) to the receiving device. The receiving device is configured to receive the signal sent by the transmitting device, and measure a phase of the received signal, to calculate a signal transmission distance.

During specific implementation, for example, the receiving device may be various general-purpose communication devices such as a mobile phone, a smart wearable device, a smart home appliance, a tablet computer, and a personal digital assistant (PDA), or may be a dedicated ranging device including a processor such as a DSP (Digital Signal Processing) chip or an OFDM (Orthogonal Frequency Division Multiplexing) baseband chip, a memory, a communication interface, and a communication bus. A specific structure or type of the receiving device is not limited in this embodiment.

Figure 1B:
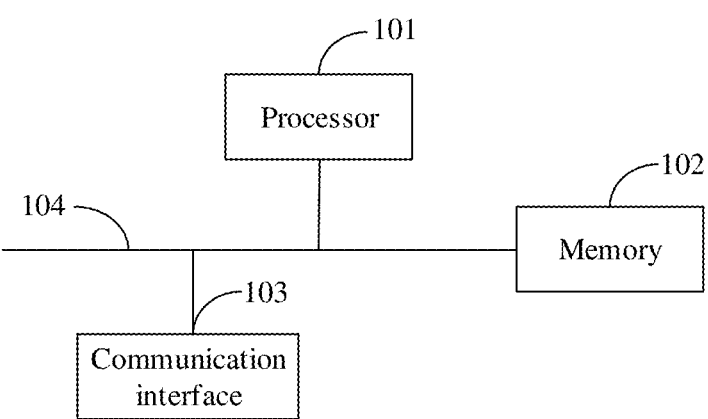
FIG. 1B is a diagram of a structure of an example receiving device according to an embodiment of this application.

Further, FIG. 1B is a diagram of a structure of a receiving device according to an embodiment of this application.

As shown in the figure, the receiving device includes a processor 101, a memory 102, a communication interface 103, and a communication bus 104. The communication bus 104 may include a channel for transmitting information between the foregoing components.

The processor 101 may be a central processing unit CPU, a microprocessor, an application-specific integrated circuit (ASIC), or one or more integrated circuits for controlling execution of this technical solution. For example, the processor 101 may be a DSP chip, an OFDM baseband chip, a field-programmable gate array (FPGA), or a microprocessor.

The memory 102 pre-stores application code, and further stores a kernel module. The kernel module includes an operating system (for example, Windows™, Android™, and iOS™) The memory 102 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, this does not constitute a limitation herein.

The communication interface 103 may be configured to send and receive a signal, and in particular, send a multi-tone signal to the processor 101 for processing after receiving the multi-tone signal from a transmitting device. The communication interface 103 includes but is not limited to an antenna, at least one amplifier, a transceiver, a coupler, an LNA (Low Noise Amplifier), a duplexer, and the like.

The processor 101 of the receiving device reads the application code in the memory 102 to perform specific steps of a phase-based ranging method provided in embodiments of this application.

It can be understood that the ranging system in FIG. 1A is merely an example implementation in embodiments of this application, and the ranging system architecture in embodiments of this application includes but is not limited to the foregoing system architecture.

For ease of understanding embodiments of this application, the following describes a phase-based ranging technology.

Figure 2:
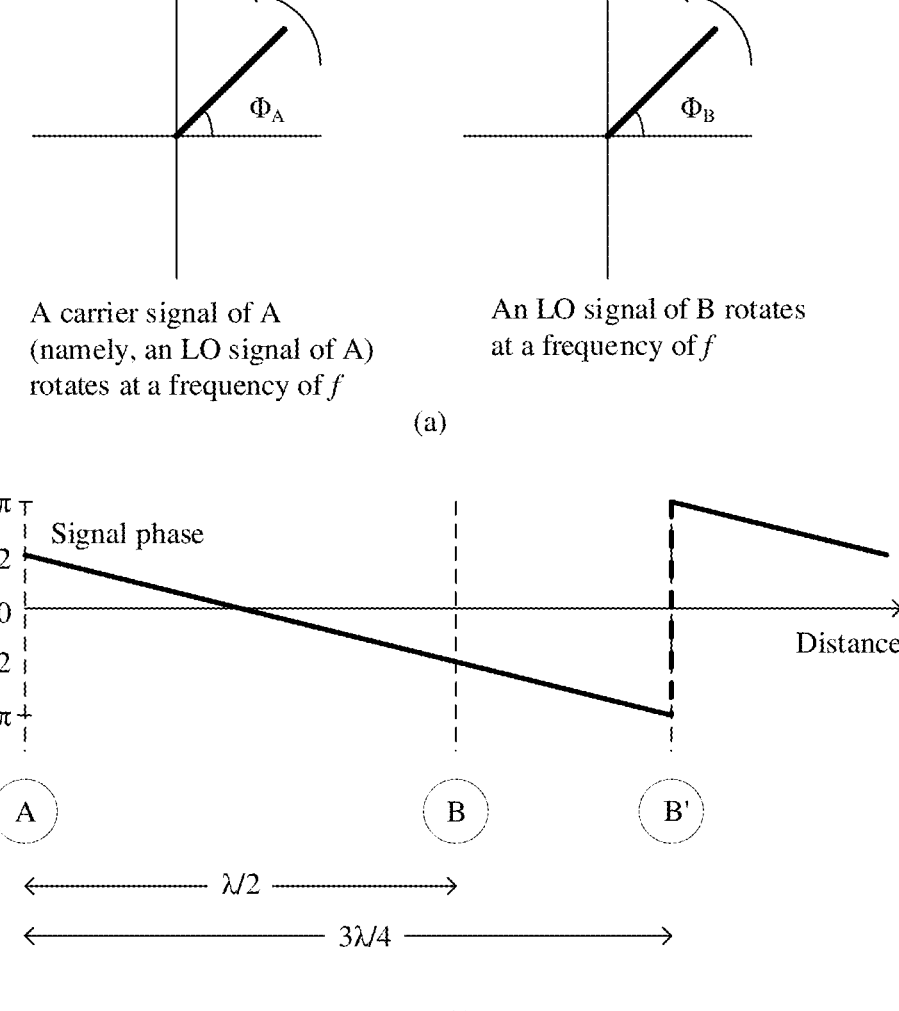
FIG. 2 is an example diagram of a signal phase and a distance according to an embodiment of this application.

Further, FIG. 2 is an example diagram of a signal phase and a distance according to an embodiment of this application. A basic relationship between a signal phase and a distance in the phase-based ranging technology in embodiments of this application is described in detail with reference to FIG. 2 by using an example in which a distance between two devices is measured. It is assumed that two devices included in a ranging system are a device A and a device B, the device A sends a carrier signal (for example, a single-frequency signal with a frequency of f) to the device B, and the device B measures a phase of the received carrier signal. As shown in (a) in FIG. 2, $\emptyset_A$ is a phase of a carrier signal sent by the device A at a specific moment, or may be understood as a phase of an LO (Local Oscillator) of the device A; and $\emptyset_B$ is a phase of an LO of the device B at the same moment. Further, as shown in (b) in FIG. 2, if a distance between the device A and the device B is half of a signal wavelength (namely, $\lambda/2$), to be specific, the device B is at a location B, a phase of a signal at the location of the device B lags behind a phase of the signal at a location of the device A by a half cycle (namely, $\pi$), and a value of the phase of the signal at the location of the device B is equal to $\emptyset_A - \pi$ (a phase shift is caused by time of flight of the signal). Similarly, if the distance between the device A and the device B is $\frac{3}{4}$ of a signal wavelength, to be specific, the device B is at a location B', a phase of a signal at the location B' is equal to $\emptyset_A - 3\pi/2$.

When the device B receives, at the location B, a signal from A, a mixer of the device B performs frequency reduction on the received signal based on an LO signal. A frequency-reduced signal is a direct current (DC) signal (because a frequency of the received signal is the same as a frequency of the LO signal of the receiving device), and a phase of the DC signal is equal to $\emptyset_A - \pi - \emptyset_B$. Similarly, when the device B receives, at the location B', a signal from A, a phase of a DC signal obtained by the device B through frequency reduction is $\emptyset_A - 3\pi c/2 - \emptyset_B$.

Further, it is assumed that a phase of an LO of the sending device A is synchronized with a phase of an LO of the receiving device B (in other words, $\emptyset_A - \emptyset_B$). In this case, phase values measured by the receiving device at the locations B and B' are $-\pi$ and $-3\pi/2$ respectively. Further, distances between the sending device and the receiving device that are respectively calculated based on the measured phase values may be as follows: $\lambda/2$ and $3\lambda/4$. To be specific, a distance is as follows: $D=-\lambda*\emptyset/2\pi$ ($\lambda$ is a wavelength of a carrier signal, $\emptyset$ is a phase, measured by the device B, of a DC signal, and D is a distance between the devices).

However, in actual application of the foregoing phase-based ranging method, because a maximum operating distance in the phase-based ranging method is only the wavelength $\lambda$ (because a valid range of phases is $[0, 2\pi)$), for example, a wavelength of a conventional 2.4 GHz ISM frequency band is only approximately 12 cm, the method is applicable only to a short-distance ranging scenario, and an actual application scenario is limited. To resolve this problem, phase measurement may be performed at two (or more) frequencies close to each other, and a distance is calculated based on a phase difference between the frequencies.

Specifically, assuming that the two frequencies are $f_1$ and $f_2$ ($f_1 < f_2$) and measured phase values are $\emptyset_1$ and $\emptyset_2$, relationships between phases and a distance D are shown in the following formula 1 and formula 2 (c is a speed of light, and mod indicates a modulo operation).

$$\phi_1 = -D * \frac{f_1}{c} * 2\pi \bmod 2\pi \qquad \text{(Formula 1)}$$

-continued $$\phi_2 = -D * \frac{f_2}{c} * 2\pi \bmod 2\pi \qquad \text{(Formula 2)}$$

According to the formula 1 and the formula 2, a phase difference between $\emptyset_1$ and $\emptyset_2$ may be obtained as follows:

$$\Delta\phi = \qquad\qquad\qquad\qquad\qquad\qquad \text{(Formula 3)}$$

$$\phi_2 - \phi_1 = -\frac{D*(f_2 - f_1)}{c} * 2\pi \bmod 2\pi = -D * \frac{1}{\lambda_V} * 2\pi \bmod 2\pi$$

In the formula 3, $\lambda_V = c/(f_2 - f_1)$ may be considered as a virtual wavelength that determines a maximum use distance of ranging. When $D < \lambda_V$, no modulo operation needs to be performed in the formula 3, and $$\Delta\phi = -D * \frac{1}{\lambda_V} * 2\pi.$$

Then the distance may be obtained according to a formula 4:

$$D = -\lambda_V * \frac{\Delta\phi}{2\pi} = -\frac{c}{(f_2 - f_1)} * \frac{\Delta\phi}{2\pi} \qquad \text{(Formula 4)}$$

If an interval between the two frequencies is 1 MHz (to be specific, $f_2 - f_1 = 1$ MHz), $\lambda_V = 300$ m. Therefore, a use distance of ranging can be greatly increased through multi-frequency phase-based ranging.

The following describes in detail a specific method architecture on which embodiments of this application are based.

Figures 3, 4:
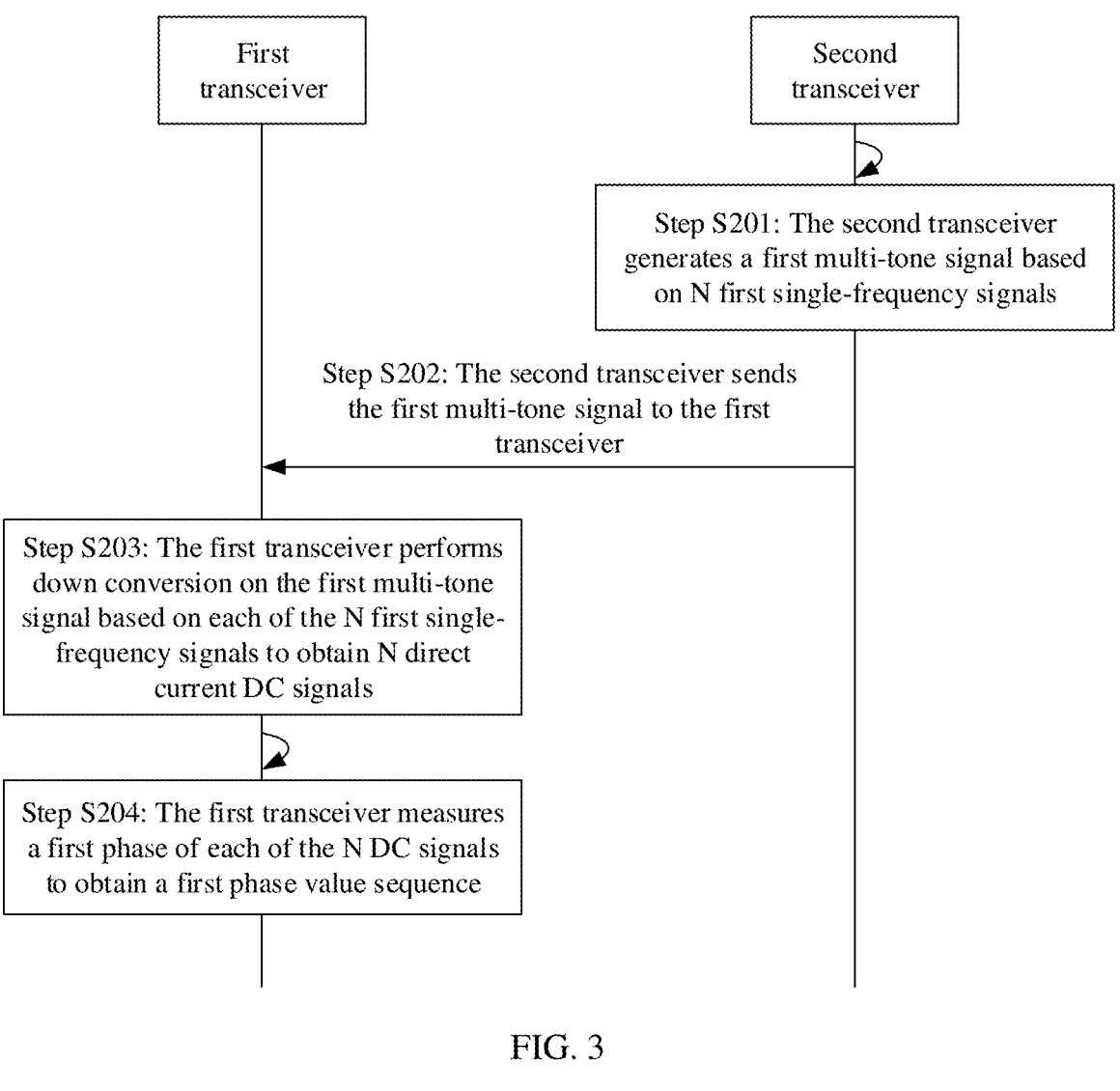
FIG. 3 is a schematic flowchart of an example phase-based ranging method according to an embodiment of this application.
FIG. 4 is a diagram of frequencies of an example multi-tone signal according to an embodiment of this application.

FIG. 3 is a schematic flowchart of an example phase-based ranging method according to an embodiment of this application. The following describes the phase-based ranging method in this embodiment from a perspective of interaction between a first transceiver (which may be the device A in FIG. 1A) and a second transceiver (which may be the device B in FIG. 1A) with reference to FIG. 3 and based on the ranging system architecture in FIG. 1A. It should be noted that, to describe the phase-based ranging method in this embodiment in more detail, that a corresponding execution entity is the first transceiver or the second transceiver is described in each process step of this application. However, this does not mean that a corresponding method process can be performed only by the described execution entity in this embodiment.

Step S201: The second transceiver generates a first multi-tone signal based on N first single-frequency signals.

Specifically, the N first single-frequency signals are signals obtained through negotiation between the first transceiver and the second transceiver, and N is an integer greater than 1. A single-frequency signal may be understood as a signal whose frequency does not change, and one single-frequency signal corresponds to one frequency. A multi-tone signal may be understood as a composite signal with a plurality of frequencies. For example, a signal generated during dialing of a telephone set is obtained by combining sine signals at two frequencies, and may also be referred to as a dual-tone signal. The N first single-frequency signals correspond to N frequencies, and the first multi-tone signal may be a signal obtained by combining the N frequencies corresponding to the N single-frequency signals.

In a possible implementation, the method further includes: The first transceiver performs a handshake procedure with the second transceiver to obtain, through negotiation, the N first single-frequency signals used during phase-based ranging. Specifically, before ranging is performed between the first transceiver and the second transceiver, the two devices may predetermine a specific frequency of a multi-tone signal through negotiation, to be specific, may first determine the N single-frequency signals through negotiation, and then obtain, based on the N single-frequency signals, the multi-tone signal used during phase-based ranging. A quantity N of single-frequency signals (to be specific, a quantity N of frequencies included in the multi-tone signal) or a frequency range of signals is not limited in this embodiment. For example, FIG. 4 is a diagram of frequencies of an example multi-tone signal according to an embodiment of this application. In the figure, the multi-tone signal may include four frequencies: 2401 MHz, 2402 MHz, 2403 MHz, and 2404 MHz. Further, the first transceiver and the second transceiver may measure a phase value at each of these frequencies through multi-tone-signal-based interaction, to determine a distance between the two devices according to a multi-frequency phase-based ranging method. In addition, in next multi-tone-signal-based interaction between the first transceiver and the second transceiver, a multi-tone signal including four other frequencies may be used. For example, the four frequencies are 2405 MHz, 2406 MHz, 2407 MHz, and 2408 MHz.

It should be noted that a wireless connection between the first transceiver and the second transceiver may be implemented through a Bluetooth technology, Wi-Fi (Wireless Fidelity, a wireless network communication technology), a ZigBee technology, or the like. This is not limited herein.

In a possible implementation, that the second transceiver generates a first multi-tone signal based on N first single-frequency signals includes: The second transceiver generates N RFLO (Radio Frequency Local Oscillator) signals based on N first frequencies corresponding to the N first single-frequency signals, where each RFLO corresponds to one first frequency; and obtains the first multi-tone signal based on the N RFLOs. Specifically, a most direct implementation method for multi-tone-signal-based interaction is to use a plurality of RFLOs. To be specific, if the second transceiver includes N RFLOs (local oscillators), each RFLO generates one RFLO signal corresponding to one frequency of the N single-frequency signals, and then a multi-tone signal obtained by combining N frequencies may be obtained based on N RFLO signals generated by the N RFLOs. Optionally, the N RFLOs send a multi-tone signal to perform phase-based ranging.

Figure 5:
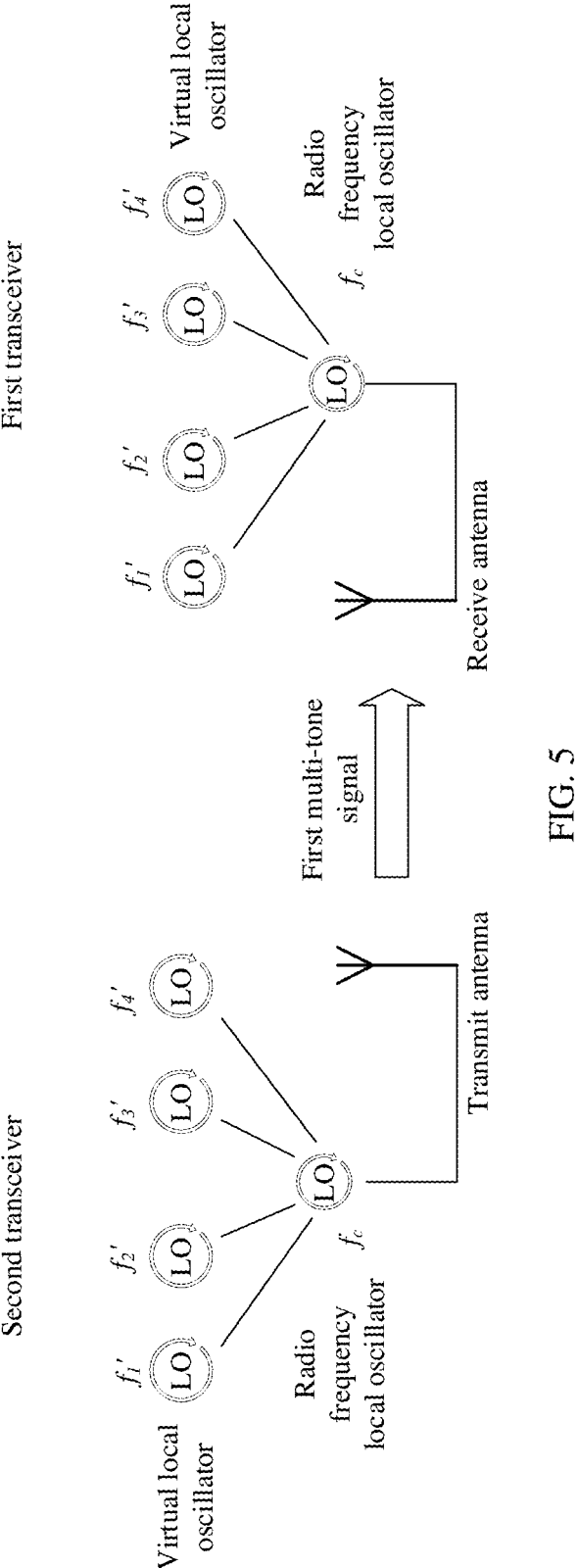
FIG. 5 is a diagram of generating an example multi-tone signal in a hybrid manner according to an embodiment of this application.

In a possible implementation, that the second transceiver generates a first multi-tone signal based on N first single-frequency signals includes: The second transceiver generates a first radio frequency local oscillator signal and N first digital local oscillator signals based on the N first frequencies corresponding to the N first single-frequency signals, where a sum of N second frequencies corresponding to the N first digital local oscillator signals and a preset frequency corresponding to the first radio frequency local oscillator signal is equal to the N first frequencies; adds up the N first digital local oscillator signals to obtain a first baseband signal; and performs up conversion on the first baseband signal based on the first radio frequency local oscillator signal to obtain the first multi-tone signal. Specifically, a disadvantage of the manner in which a plurality of RFLOs are used lies in an increase in costs, power consumption, and an area of an RF circuit. Therefore, embodiments of this application provide a hybrid implementation. To be specific, sending and receiving of a multi-tone signal and phase measurement are implemented by one RFLO and a plurality of digital LOs. For example, FIG. 5 is an example diagram of generating a multi-tone signal in a hybrid manner according to an embodiment of this application. It is assumed that the first transceiver and the second transceiver determine, through negotiation, that a multi-tone signal includes four frequencies: 2401 MHz, 2402 MHz, 2403 MHz, and 2404 MHz (to be specific, frequencies of four single-frequency signals). In the figure, $f_c$ of the second transceiver is a frequency of an RFLO (to be specific, a preset frequency of a radio frequency local oscillator signal), and $f_1'$ to $f_4'$ are frequencies of four digital LOs (to be specific, frequencies of N digital local oscillator signals). A digital LO is implemented by using a signal $A*e^{j*2\pi*f_i*t}$ (to be specific, a digital local oscillator signal, which is an IQ signal), where A is an amplitude, and $f_i$ is a frequency of the digital LO. In this example, it should be ensured that a sum of each of $f_1'$ to $f_4'$ and $f_c$ is equal to each of the frequencies of the four single-frequency signals that are pre-obtained through negotiation, so that the first multi-tone signal sent by the second transceiver includes the four frequencies: 2401 MHz, 2402 MHz, 2403 MHz, and 2404 MHz. Optionally, assuming that $f_c$ is 2402.5 MHz, $f_1'$ to $f_4'$ are −1.5 MHz, −0.5 MHz, 0.5 MHz, and 1.5 MHz respectively. Alternatively, another combination manner may be selected. For example, assuming that $f_c$ is 2402 M, $f_1'$ to $f_4'$ are −1 MHz, 0 MHz, 1 MHz, and 2 MHz respectively. This is not limited herein. When the second transceiver sends the first multi-tone signal, signals of a plurality of digital LOs are added up as a baseband signal, and the baseband signal is sent to an RFLO through a DAC (Digital to Analog Converter). The RFLO performs up conversion on the baseband signal based on a radio frequency local oscillator signal to obtain the first multi-tone signal, and then sends the first multi-tone signal through an antenna.

In a possible implementation, higher bandwidth of an interfered-with frequency band of a channel between the first transceiver and the second transceiver indicates a smaller quantity N of first single-frequency signals included in the first multi-tone signal. Specifically, during multi-tone-signal-based interaction, a device may adjust a quantity N of frequencies in the multi-tone signal based on a status of interference between adjacent channels. For example, when there is interference between adjacent channels, a small N may be used to avoid impact of the interference; or when there is no interference between adjacent channels, a large N may be used to complete ranging more quickly.

Step S202: The second transceiver sends the first multi-tone signal to the first transceiver.

If the second transceiver generates a multi-tone signal in the foregoing manner in which a plurality of RFLOs are used, the second transceiver may add up a plurality of RFLO local oscillator signals and send a signal obtained through addition to the first transceiver, so that the first transceiver simultaneously receives signals at a plurality of frequencies (namely, a multi-tone signal). For example, the multi-tone signal includes two frequencies: $f_1$ and $f_2$. In this case, an RFLO 1 in the second transceiver generates $F(f_1)$, an RFLO 2 generates $F(f_2)$, $F(f_1)$ and $F(f_2)$ may be added up to obtain a multi-tone signal, and the signal is sent to the first transceiver, so that the first transceiver simultaneously receives signals at a plurality of frequencies, namely, the first multi-tone signal (including $F(f_1)$ and $F(f_2)$). If the second transceiver generates a multi-tone signal in the foregoing hybrid manner, the second transceiver may send a multi-frequency signal to the first transceiver through one RFLO. For example, the multi-tone signal includes two frequencies: $f_1$ and $f_2$. In this case, a digital LO 1 and a digital LO 2 in the second transceiver may generate two digital local oscillator signals, and the two digital local oscillator signals are added up to obtain a baseband signal (for example, $F'(f_1', f_2')$). Then up conversion is performed on the baseband signal based on a radio frequency local oscillator signal of the RFLO to obtain a multi-tone signal ($F(f_1'+f_c, f_2'+f_c)$, where $f_1'+f_c=f_1$, and $f_2'+f_c=f_2$), and the multi-tone signal is sent to the first transceiver, so that the first transceiver simultaneously receives signals at a plurality of frequencies.

In a possible implementation, the method further includes: The first transceiver receives a carrier signal sent by the second transceiver, where the carrier signal is a single-frequency signal; and determines a frequency deviation between the first transceiver and the second transceiver based on the carrier signal, where the frequency deviation is used to calibrate a frequency offset between the first transceiver and the second transceiver. Specifically, the frequency offset (Carrier Frequency Offset, CFO) between the first transceiver and the second transceiver affects accuracy of phase measurement. Therefore, before the two devices perform multi-tone-signal-based interaction, the second transceiver may send a carrier signal to the first transceiver at a specific frequency, and the first transceiver estimates and compensates for the CFO, so that the CFO between the two devices is close to zero. This improves measurement accuracy.

Step S203: The first transceiver performs down conversion on the first multi-tone signal based on each of the N first single-frequency signals to obtain N direct current (DC) signals.

Figure 6:
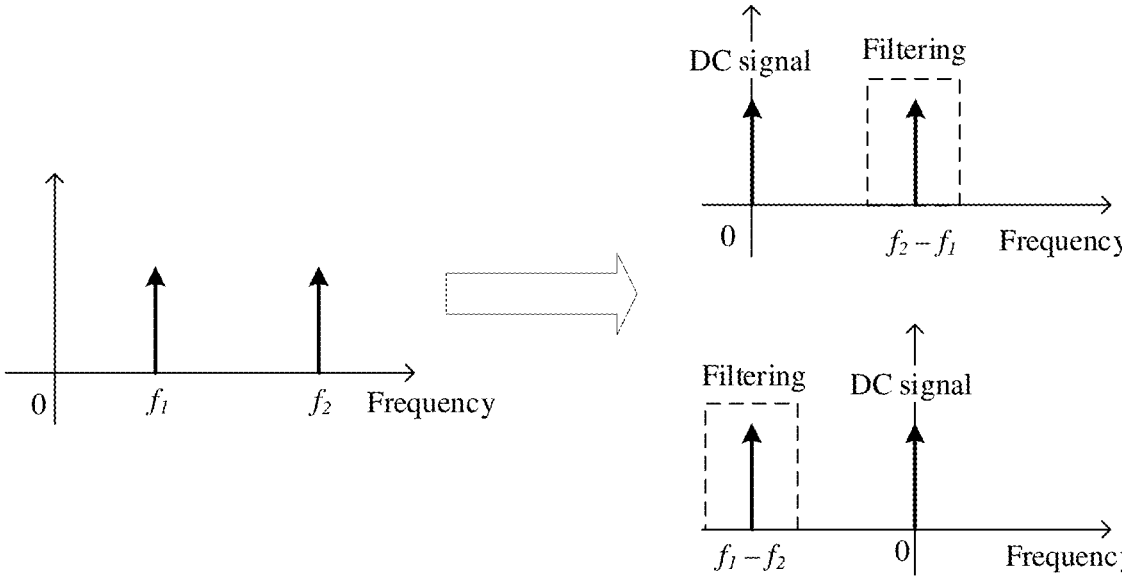
FIG. 6 is a diagram of an example spectrum of a multi-tone signal and a direct current (DC) signal according to an embodiment of this application.

Specifically, a frequency of the DC signal is 0. For example, FIG. 6 is an example diagram of a spectrum of a multi-tone signal and a direct current (DC) signal according to an embodiment of this application. In the figure, a multi-tone signal received by the first transceiver includes two frequencies. To be specific, the first multi-tone signal is $F(f_1, f_2)$. Because the first multi-tone signal is generated based on a single-frequency signal obtained through negotiation between the first transceiver and the second transceiver, the first transceiver may perform down conversion on $F(f_1, f_2)$ based on a single-frequency signal corresponding to $f_1$ and a single-frequency signal corresponding to $f_2$ to obtain $F_1(0, f_2-f_1)$ and $F_2(f_1-f_2, 0)$ respectively, and may obtain two direct current (DC) signals through filtering: $F_1(0)$ and $F_2(0)$.

In a possible implementation, that the first transceiver performs down conversion on the first multi-tone signal based on each of the N first single-frequency signals to obtain N first direct current (DC) signals includes: The first transceiver generates a second radio frequency local oscillator signal and N first digital local oscillator signals based on the N first frequencies corresponding to the N first single-frequency signals, where a sum of N second frequencies corresponding to the N first digital local oscillator signals and a preset frequency corresponding to the second radio frequency local oscillator signal is equal to the N first frequencies; and performs down conversion on the first multi-tone signal based on the second radio frequency local oscillator signal and the N first digital local oscillator signals to obtain the N DC signals. Specifically, the N first frequencies corresponding to the N single-frequency signals are $f_1$, $f_2$, . . . , $f_N$; the second radio frequency local oscillator signal is a signal generated by an RFLO based on a preset frequency $f_c$, for example, a signal generated by an RFLO of the first transceiver based on $f_c$ in FIG. 5; and the N first digital local oscillator signals are signals generated by N digital LOs based on $f_1-f_c, f_2-f_c, \ldots, f_N-f_c$, for example, signals generated by N digital LOs in FIG. 5 (this may be implemented by hardware). It should be noted that, both the digital LO and the RFLO may be implemented by using hardware. A difference lies in that the RFLO is implemented by using an analog circuit, and costs are much higher than costs of a digital circuit for implementing the digital LO. Down conversion can be performed on the first multi-tone signal $F(f_1, f_2, \ldots, f_N)$ based on the second radio frequency local oscillator signal and each of the N first digital local oscillator signals to obtain the N DC signals: $F_1(0)$, $F_2(0)$, . . . , and $F_N(0)$.

Figure 7:
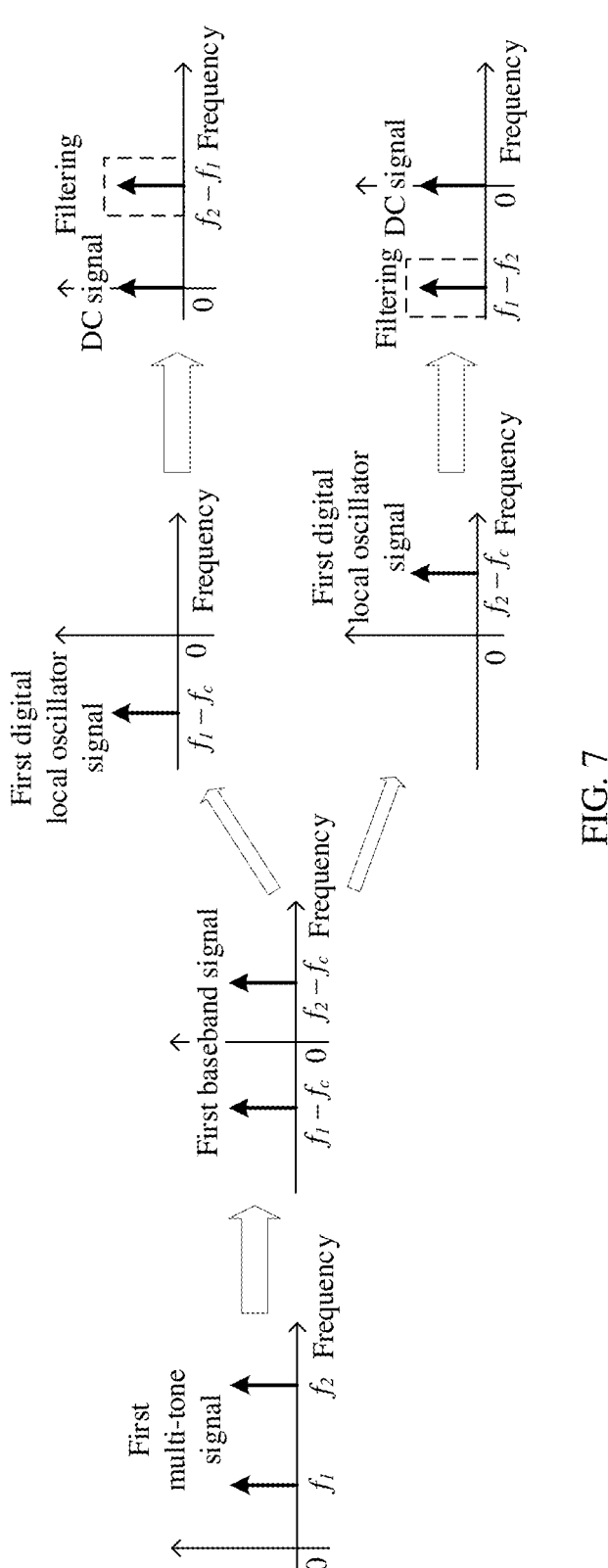
FIG. 7 is a diagram of another example spectrum of a multi-tone signal and a direct current (DC) signal according to an embodiment of this application.
Figure 8:
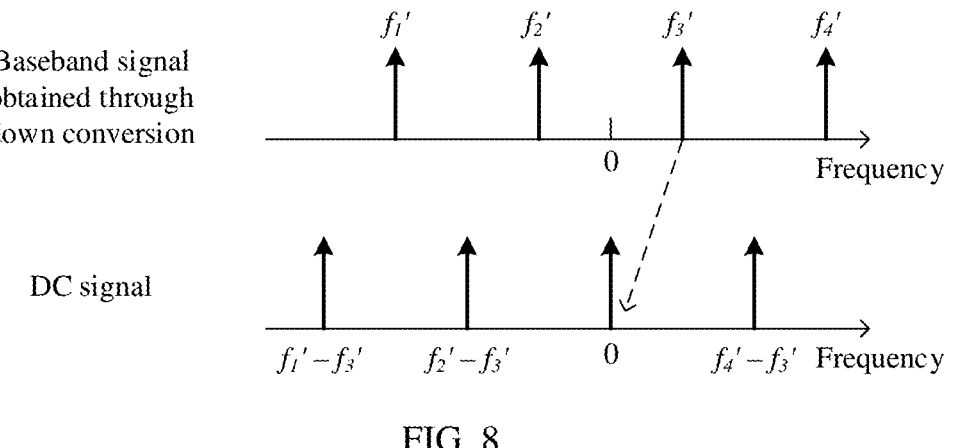
FIG. 8 is a diagram of example digital down conversion according to an embodiment of this application.

In a possible implementation, that the first transceiver performs down conversion on the first multi-tone signal based on the second radio frequency local oscillator signal and the N first digital local oscillator signals to obtain the N DC signals includes: The first transceiver performs down conversion on the first multi-tone signal based on the second radio frequency local oscillator signal to obtain a first baseband signal, where the first baseband signal is a signal obtained by performing spectrum shifting on the first multi-tone signal based on the preset frequency; and performs digital down conversion on the first baseband signal based on each of the N first digital local oscillator signals to obtain the N DC signals. Specifically, when receiving a multi-tone signal, a device may first perform down conversion on the multi-tone signal by using an RFLO to convert the multi-tone signal into a baseband signal, then provide the baseband signal for each digital LO to perform digital down conversion to convert a signal corresponding to each digital LO frequency into a DC signal, and then perform phase measurement. For example, FIG. 7 is a diagram of another example spectrum of a multi-tone signal and a direct current (DC) signal according to an embodiment of this application. In the figure, an example in which the multi-tone signal includes two frequencies $F(f_1, f_2)$ is used to describe a down conversion process for the multi-tone signal. First, the RFLO performs down conversion on a multi-tone signal based on preset $f_c$ to obtain a baseband signal $F'(f_1-f_c, f_2-f_c)$, and then provides the baseband signal for the digital LO 1 and the digital LO 2 to perform digital down conversion. Phase measurement for a signal corresponding to $f_2$ is used as an example. Frequencies, obtained through digital down conversion, of two signals are $f_1-f_2$ and 0, and are mixed together. Further, to obtain a phase of a second signal, the signal may be filtered to obtain a DC signal corresponding to the second signal, and similarly, a DC signal corresponding to a first signal can be obtained. Optionally, FIG. 8 is an example diagram of digital down conversion according to an embodiment of this application. In the figure, an example in which a multi-tone signal includes four frequencies is used, and $f_1'$ to $f_4'$ are frequencies of four digital LOs. Phase measurement for a signal corresponding to $f_3'$ is used as an example. Frequencies, obtained through digital down conversion, of four signals are $f_1'-f_3'$, $f_2'-f_3'$, 0, and $f_4'-f_3'$, and are mixed together. Further, to obtain a phase of a third signal, IQ averaging may be performed on signals obtained through digital down conversion, and a used IQ accumulation cycle is a common multiple of $1/(f_1'-f_3')$, $1/(f_2'-f_3')$, and $1/(f_4'-f_3')$. In this way, impact of the other signals on the third signal can be canceled, so that a phase included in a final average IQ is the phase of the third signal. Similarly, phases of the other three signals may be obtained.

Figure 9:
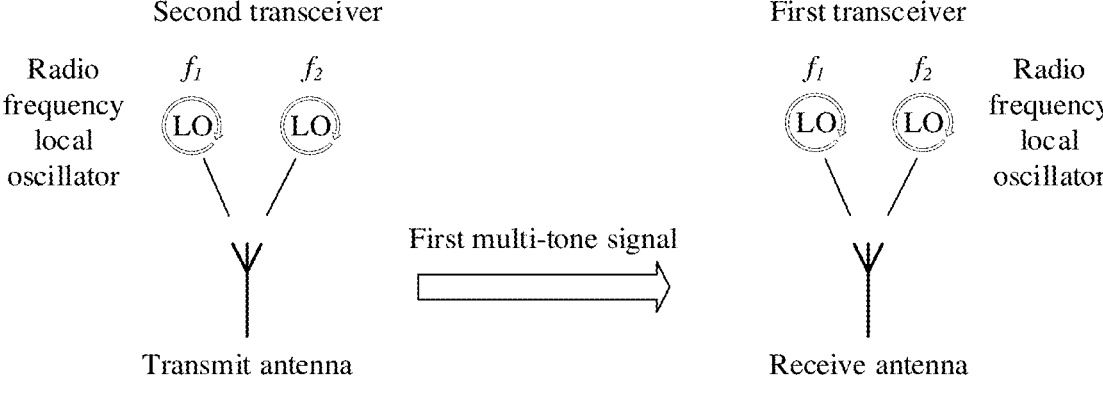
FIG. 9 is a diagram of an example local oscillator according to an embodiment of this application.
Figure 10:
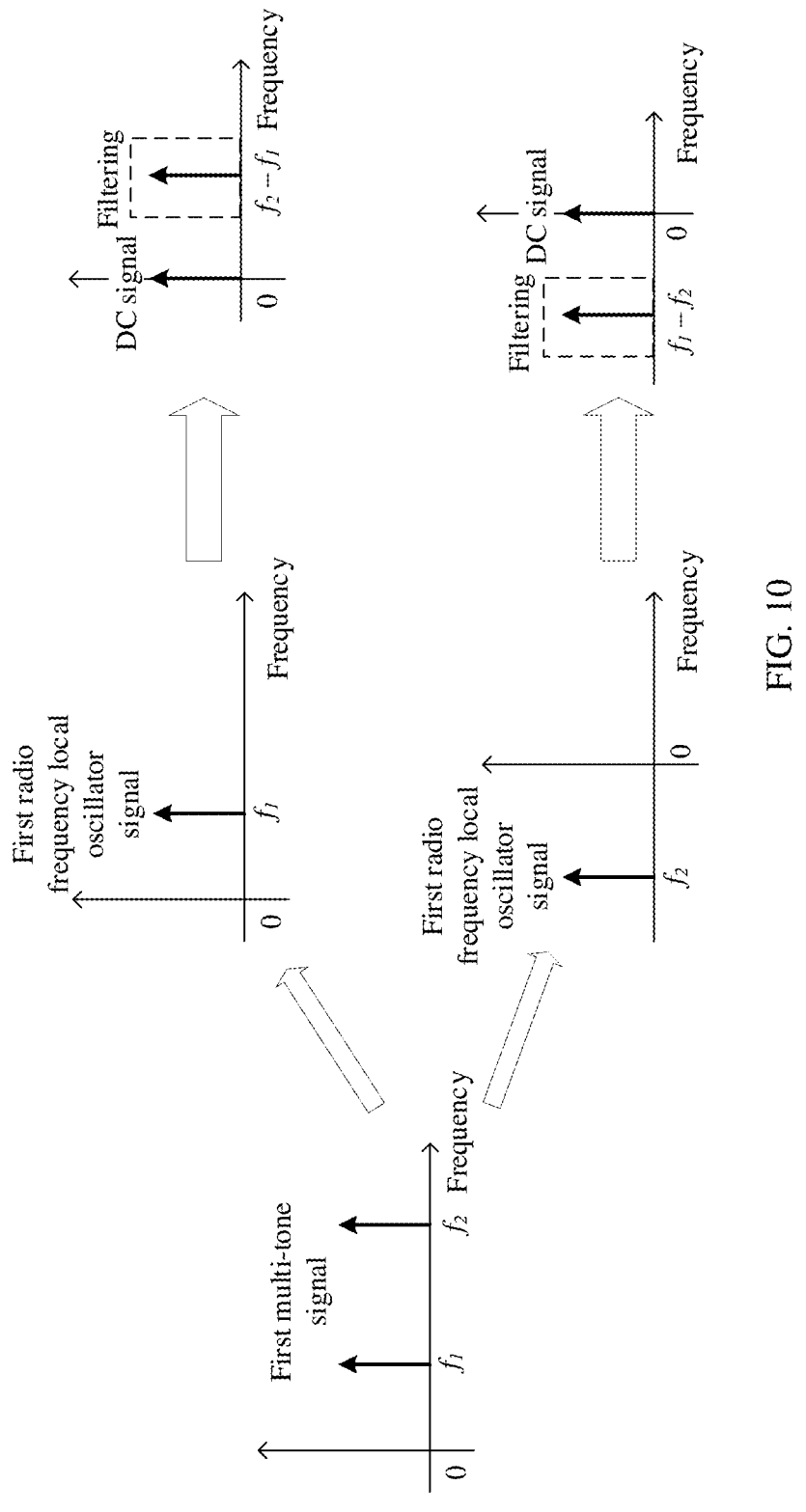
FIG. 10 is an example diagram of down conversion according to an embodiment of this application.

In a possible implementation, that the first transceiver performs down conversion on the first multi-tone signal based on each of the N first single-frequency signals to obtain N direct current (DC) signals includes: The first transceiver generates N first radio frequency local oscillator signals based on the N first frequencies corresponding to the N first single-frequency signals, where each first radio frequency local oscillator signal corresponds to one first frequency; and performs down conversion on the first multi-tone signal based on each of the N first radio frequency local oscillator signals to obtain the N DC signals. When the second transceiver sends a multi-tone signal based on N RFLOs, N RFLOs also need to be designed in the first transceiver, to ensure that the first transceiver can simultaneously receive the multi-tone signal sent by the second transceiver. For example, FIG. 9 is a diagram of an example local oscillator according to an embodiment of this application. In the figure, it is assumed that the second transceiver sends a multi-tone signal (the multi-tone signal includes two frequencies) based on two RFLOs. To be specific, the second transceiver generates two RFLO local oscillator signals based on the two RFLOs, adds up the two RFLO signals to obtain the multi-tone signal, and then sends the multi-tone signal to the first transceiver. Then two RFLOs of the first transceiver each generate a radio frequency local oscillator signal based on a frequency, pre-obtained through negotiation, of a single-frequency signal, and perform down conversion on a received signal to obtain two direct current (DC) signals. For example, FIG. 10 is an example diagram of down conversion according to an embodiment of this application. In the figure, an example in which a multi-tone signal $F(f_1, f_2)$ includes two frequencies is used. An RFLO 1 in the first receiver generates a radio frequency local oscillator signal $F(f_1)$ based on a single-frequency signal with a frequency of $f_1$, and performs down conversion on the received $F(f_1, f_2)$ to obtain $F_1(0, f_2-f_1)$, and then may filter $F_1(0, f_2-f_1)$ to obtain $F_1(0)$. Similarly, $F_2(0)$ can be obtained based on an RFLO 2 in the first transceiver.

Step S204: The first transceiver measures a first phase of each of the N DC signals to obtain a first phase value sequence.

Specifically, the first phase includes a phase shift value generated during transmission of a first single-frequency signal corresponding to each DC signal from the second transceiver to the first transceiver, the first phase value sequence includes the first phase of each of the N DC signals, and the first phase value sequence is used to calculate a distance between the first transceiver and the second transceiver. It is assumed that the first multi-tone signal $F(f_1, f_2)$ includes two frequencies and the first transceiver can perform down conversion on $F(f_1, f_2)$ to obtain two direct current (DC) signals: $F_1(0)$ and $F_2(0)$. Further, the first transceiver measures a phase of each of $F_1(0)$ and $F_2(0)$ to obtain a first phase value sequence. The sequence includes a phase $\emptyset_1$ of $F_1(0)$ and a phase $\emptyset_2$ of $F_2(0)$. $\emptyset_1$ and $\emptyset_2$ are phase shifts generated during transmission of single-frequency signals respectively corresponding to the two DC signals from the second transceiver to the first transceiver, and correspond to $\emptyset_1$ in the formula 1 and $\emptyset_2$ in the formula 2 respectively.

Optionally, if a phase of an LO of the second transceiver is synchronized with a phase of an LO of the first transceiver, a plurality of frequencies included in each of the first phase value sequence and the multi-tone signal may be separately substituted into the formula 4 to calculate the distance between the first transceiver and the second transceiver. It should be noted that the two devices may be connected to a central controller through cables, and then the central controller synchronizes initial phases of LOs of the two devices through a pulse, so that phases of the LOs of the first transceiver and the second transceiver can be synchronized.

Figure 11:
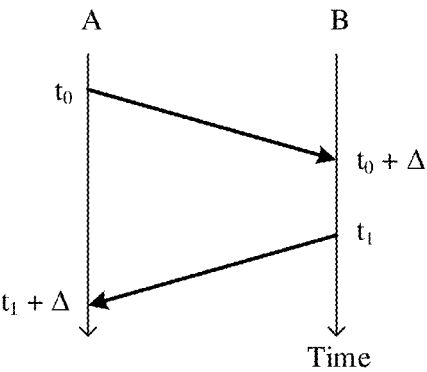
FIG. 11 is an example diagram of interaction between devices according to an embodiment of this application.

It should be noted that, when the phase of the LO of the second transceiver is synchronized with the phase of the LO of the first transceiver, the obtained first phase value sequence may be substituted into the formula 4 to calculate the distance between the devices. However, it is quite difficult to implement phase synchronization between two wirelessly connected devices during actual use. Consequently, initial phases of the two devices cannot cancel each other. This further affects a measured phase value. To eliminate impact of the initial phases of the two devices, the devices may send signals to each other and perform phase measurement (to be specific, two-way phase measurement). It should be noted that the initial phases of the two devices should remain unchanged in a process in which the devices send signals to each other. How to eliminate impact of initial phases of two devices is described in detail below with reference to FIG. 11 by using a single-frequency signal (with a frequency of f) as an example. FIG. 11 is an example diagram of interaction between devices according to an embodiment of this application. In the figure, a signal sent by a device A at a moment $t_0$ arrives at a device B at a moment $t_0+\Delta$ (where $\Delta=D/C$, and $\Delta$ is time of flight of the signal), and the device B measures a phase. Then the device A becomes a receiving device, and the device B becomes a sending device. A signal sent by the device B at a moment $t_1$ arrives at the device A at a moment $t_1+\Delta$, and the device A measures a phase. During the foregoing signal interaction, phases at the moments are as follows:

At the moment $t_0$, a phase of the signal sent by A (or a phase of an LO of A) is $2\pi f t_0+\varnothing_A$, where $\varnothing_A$ is an initial phase of the LO of the device A.

At the moment $t_0+\Delta$, a phase of an LO of B is $2\pi f(t_0+\Delta)+\varnothing_B$, where $\varnothing_B$ is an initial phase of the LO of the device B. In this case, a phase of the signal that arrives at B from A is $2\pi f t_0+\varnothing_A$. Therefore, a phase measured by B after down conversion is $\varnothing_{Bm}=-2\pi f\Delta+\varnothing_A-\varnothing_B$.

At the moment $t_1$, a phase of the signal sent by B (or a phase of the LO of B) is $2\pi f t_1+\varnothing_B$.

At the moment $t_1+\Delta$, a phase of the LO of A is $2\pi f(t_1+\Delta)+\varnothing_A$. In this case, a phase of the signal that arrives at A from B is $2\pi f t_1+\varnothing_B$. Therefore, a phase measured by A after down conversion is $\varnothing_{Am}=-2\pi f\Delta+\varnothing_B-\varnothing_A$.

The phases measured by the two devices may be added up to cancel impact of initial phases. In this case, a formula 5 is obtained:

$$\varnothing_m = \varnothing_{Am} + \varnothing_{Bm} = -4\pi f \Delta \qquad \text{(Formula 5)}$$

Further, time of flight $\Delta$ of the signal can be calculated based on the formula 5, to calculate a distance between the devices.

It should be noted that, to ensure continuity of phases of LOs of a device, during TX/RX (transmitting device/receiving device) role switching of the device (the device A switches from a TX role to an RX role, and the device B switches from an RX role to a TX role), a PLL (phase-locked loop) of the device needs to be prevented from out-of-lock, to ensure continuity of phases. However, when the device switches to another frequency through frequency hopping to perform similar two-way signal interaction, the PLL does not need to be prevented from out-of-lock during the frequency hopping.

Figure 12:
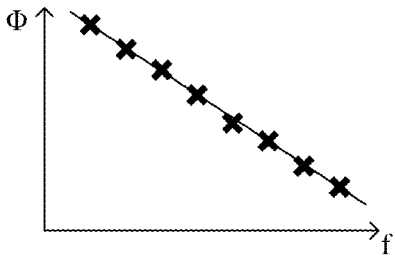
FIG. 12 is a diagram of an example relationship between a signal phase and a frequency according to an embodiment of this application.

To improve ranging accuracy, refer to FIG. 12. FIG. 12 is a diagram of an example relationship between a signal phase and a frequency according to an embodiment of this application. In the figure, the foregoing two-way phase measurement may be performed based on a plurality of frequencies to obtain a plurality of phase values, and then a distance value is estimated based on a slope of a phase changing with a frequency.

Figure 13:
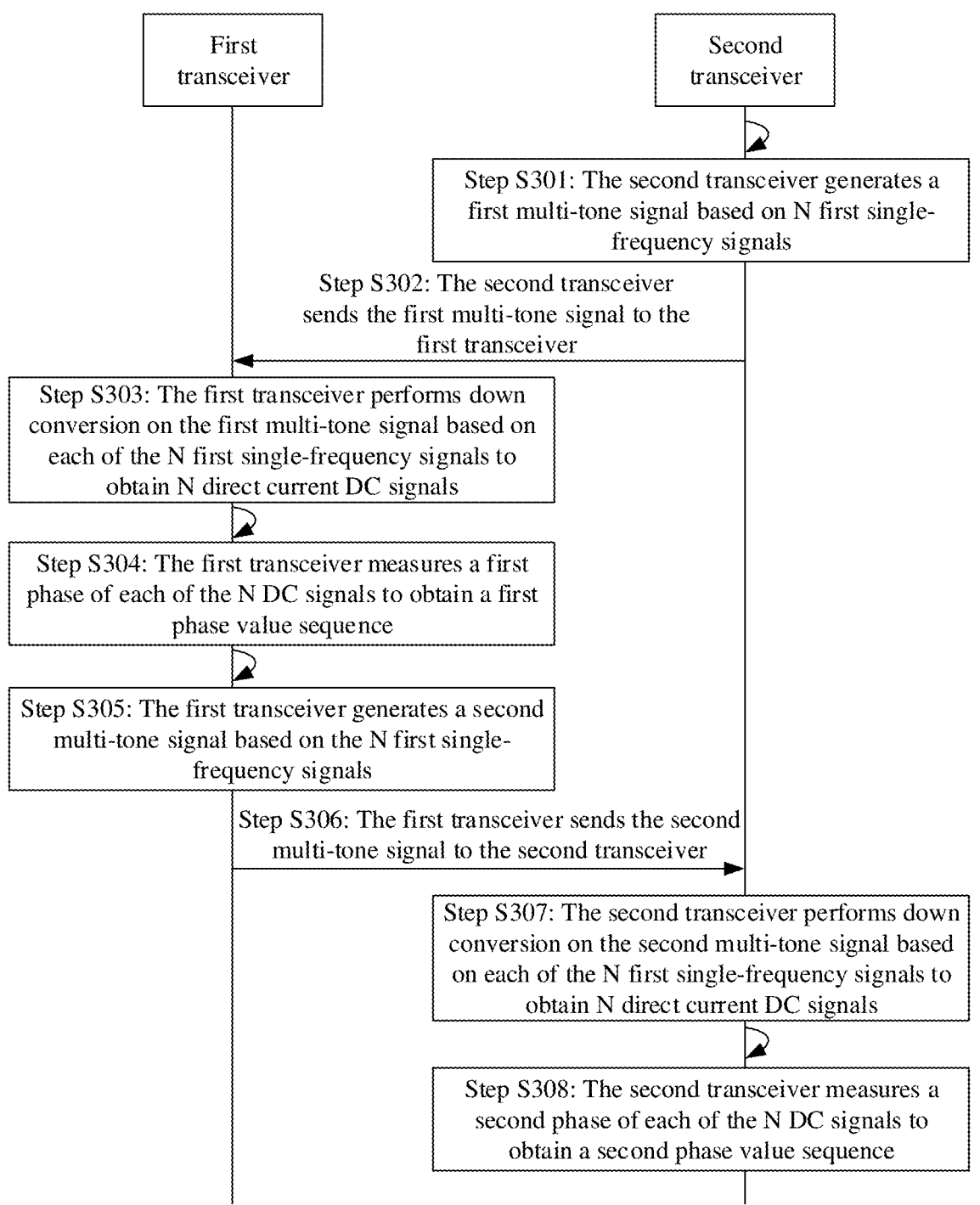
FIG. 13 is a schematic flowchart of another example phase-based ranging method according to an embodiment of this application.

FIG. 13 is a schematic flowchart of another example phase-based ranging method according to an embodiment of this application. The following describes the phase-based ranging method in this embodiment from a perspective of interaction between a first transceiver (which may be the device A in FIG. 1A) and a second transceiver (which may be the device B in FIG. 1A) with reference to FIG. 13. It should be noted that, for detailed descriptions of step S301 to step S304 in FIG. 13, reference may be made to related descriptions of step S201 to step S204 in FIG. 3.

Step S305: The first transceiver generates a second multi-tone signal based on the N first single-frequency signals.

Specifically, after the first transceiver, as a receiving device, receives a multi-tone signal sent by the second transceiver and obtains a first phase value sequence based on the multi-tone signal, when it is ensured that initial phases of the first transceiver and the second transceiver remain unchanged, the first transceiver may become a sending device and send, to the second transceiver, a multi-tone signal including a same frequency, to implement the two-way phase measurement.

In a possible implementation, that the first transceiver generates a second multi-tone signal based on the N first single-frequency signals includes: The first transceiver adds up the N first digital local oscillator signals to obtain a second baseband signal, and performs up conversion on the second baseband signal based on the second radio frequency local oscillator signal to obtain the second multi-tone signal. To eliminate impact of local oscillator initial phases of the first transceiver and the second transceiver, it needs to be ensured that an initial phase of an LO in a case in which the first transceiver performs down conversion is the same as an initial phase of an LO in a case in which the first transceiver sends a multi-tone signal. Therefore, when generating the second multi-tone signal, the first transceiver may obtain the second multi-tone signal based on digital local oscillator signals generated by N digital LOs and a radio frequency local oscillator signal generated by an RFLO, to eliminate impact of the initial phases through two-way phase measurement. This improves accuracy of phase-based ranging.

Step S306: The first transceiver sends the second multi-tone signal to the second transceiver.

The first transceiver may generate the second multi-tone signal in the foregoing hybrid manner, so that a multi-frequency signal can be sent to the second transceiver through one RFLO, and the second transceiver receives a multi-frequency signal whose frequencies are the same as frequencies of the first multi-tone signal.

Step S307: The second transceiver performs down conversion on the second multi-tone signal based on each of the N first single-frequency signals to obtain N direct current (DC) signals.

Each first single-frequency signal corresponds to one DC signal. For example, the first multi-tone signal includes two frequencies. To be specific, the first multi-tone signal is $F(f_1, f_2)$. In this case, the second multi-tone signal is also a signal $G(f_1, f_2)$ including the two frequencies. Because the second multi-tone signal is generated based on a single-frequency signal obtained through negotiation between the first transceiver and the second transceiver, the second transceiver may perform down conversion on G(f$_1$, f$_2$) based on a single-frequency signal corresponding to f$_1$ and a single-frequency signal corresponding to f$_2$ to obtain G$_1$(0, f$_2$−f$_1$) and G$_2$(f$_1$−f$_2$, 0) respectively, and may obtain two direct current (DC) signals through filtering: G$_1$(0) and G$_2$(0).

Step S308: The second transceiver measures a second phase of each of the N DC signals to obtain a second phase value sequence.

The second phase includes a phase shift value generated during transmission of a first single-frequency signal corresponding to each DC signal from the first transceiver to the second transceiver, the second phase value sequence includes the second phase of each of the N DC signals, and the first phase value sequence, together with the second phase value sequence, is used to calculate a distance between the first transceiver and the second transceiver. It is assumed that the second multi-tone signal G(f$_1$,f$_2$) includes two frequencies and the second transceiver can perform down conversion on G(f$_1$, f$_2$) to obtain two direct current (DC) signals: G$_1$(0) and G$_2$(0). Further, the first transceiver measures a phase of each of G$_1$(0) and G$_2$(0) to obtain a second phase value sequence. The sequence includes a phase Ø$_1$' of G$_1$(0) and a phase Ø$_2$' of G$_2$(0). Ø$_1$' and Ø$_2$' are phase shifts generated during transmission of single-frequency signals respectively corresponding to the two DC signals from the first transceiver to the second transceiver.

In a possible implementation, the method further includes: The first transceiver determines time of flight of a signal between the first transceiver and the second transceiver based on the first phase value sequence and the second phase value sequence, and determines the distance between the first transceiver and the second transceiver based on the time of flight. Specifically, the first phase value sequence and the second phase value sequence may be separately substituted into the formula 5 to calculate the time of flight of the signal, so that the distance between the devices is calculated based on the time of flight of the signal.

For example, as shown in FIG. 11, it is assumed in the figure that both a device A and a device B implement sending and receiving of a multi-tone signal and phase measurement by using one RFLO and a plurality of digital LOs. In addition, before phase-based ranging is performed, it is determined, through negotiation, that a multi-tone signal F(f$_1$, f$_2$) includes two frequencies. In addition, a preset frequency of the RFLO is f$_c$, frequencies of the two digital LOs are f$_1$' and f$_2$', f$_1$'+f$_c$=f$_1$, and f$_2$+f$_c$=f$_2$. A signal sent by the device A at a moment t$_0$ arrives at the device B at a moment t$_0$+Δ (where Δ=D/C, and Δ is time of flight of the signal), and the device B measures each phase of the multi-tone signal. Then the device A becomes a receiving device, and the device B becomes a sending device. A signal sent by the device B at a moment t$_1$ arrives at the device A at a moment t$_1$+Δ, and the device A measures each phase of the multi-tone signal. A first signal (to be specific, a signal with a frequency of f$_1$) in the multi-tone signal is used as an example. Correspondingly, phases at the moments are as follows:

Ø$_A$ and Ø$_{A1}$ are initial phases of an RFLO and a first digital LO of the device A respectively. Ø$_B$ and Ø$_{B1}$ are initial phases of an RFLO and a first digital LO of the device B respectively. f$_c$ is a preset frequency of the RFLO.

At the moment t$_0$, a phase of the RFLO of A is 2πf$_c$t$_0$+Ø$_A$, and a phase of the first digital LO of A is 2πf$_1$'t$_0$+Ø$_{A1}$. Therefore, a phase of the signal sent by A is 2πf$_c$t$_0$+Ø$_A$+ 2πf$_1$'t$_0$+Ø$_{A1}$.

At the moment t$_0$+Δ, a phase of the RFLO of B is 2πf$_c$(t$_0$+Δ)+Ø$_B$, and a phase of the first digital LO of B is 2πf$_1$'(t$_0$+Δ)+Ø$_{B1}$. In this case, a phase of the signal that arrives at B from A is 2πf$_c$t$_0$+Ø$_A$+2πf$_1$t$_0$+Ø$_{A1}$. Therefore, a phase of a first signal of B that is obtained through down conversion by the RFLO is as follows:

2πf$_c$t$_0$+Ø$_A$+2πf$_1$'t$_0$+Ø$_{A1}$−(2πf$_c$(t$_0$+Δ)+Ø$_B$)=2πf$_1$'t$_0$− 2πf$_c$Δ+Ø$_A$+Ø$_{A1}$−Ø$_B$. Then a phase (to be specific, a measured phase) of a first signal obtained through digital down conversion by the first digital LO is as follows:

$$\emptyset_{Am} = 2\pi f_1 t_0 - 2\pi f_c \Delta + \emptyset_A + \emptyset_{A1} - \emptyset_B - (2\pi f_1'(t_0 + \Delta) + \emptyset_{B1}) =$$
$$-2\pi(f_c + f_1')\Delta + \emptyset_A + \emptyset_{A1} - \emptyset_B - \emptyset_{B1}$$

At the moment t$_1$, a phase of the RFLO of B is 2πf$_c$t$_1$+Ø$_B$, and a phase of the first digital LO of B is 2πf$_1$'t$_1$+Ø$_{B1}$. Therefore, a phase of the signal sent by B is 2πf$_c$t$_1$+Ø$_B$+ 2πf$_1$'t$_1$+Ø$_{B1}$.

At the moment t$_1$+Δ, a phase of the RFLO of A is 2πf$_c$(t$_1$+Δ)+Ø$_A$, and a phase of the first digital LO of A is 2πf$_1$'(t$_1$+Δ)+Ø$_{A1}$. In this case, a phase of the signal that arrives at A from B is 2πf$_c$t$_1$+Ø$_B$+2πf$_1$'t$_1$+Ø$_{B1}$. Therefore, a phase of a first signal of A that is obtained through down conversion by the RFLO is as follows:

2πf$_c$t$_1$+Ø$_B$+2πf$_1$'t$_1$+Ø$_{B1}$−(2πf$_c$(t$_1$+Δ)+Ø$_A$)=2πf$_1$'t$_1$− 2πf$_c$Δ+Ø$_B$+Ø$_{B1}$−Ø$_A$. Then a phase (to be specific, a measured phase) of a first signal obtained through digital down conversion by the first digital LO is as follows:

$$\emptyset_{Bm} = 2\pi f_1't_1 - 2\pi f_c\Delta + \emptyset_B + \emptyset_{B1} - \emptyset_A - (2\pi f_1'(t_1 + \Delta) + \emptyset_{A1}) =$$
$$-2\pi(f_c + f_1')\Delta + \emptyset_B + \emptyset_{B1} - \emptyset_A - \emptyset_{A1}$$

The phases measured by the two devices may be added up to cancel impact of initial phases. In this case, a formula 6 is obtained:

$$\emptyset_m = \emptyset_{Am} + \emptyset_{Bm} = -4\pi(f_c + f_1')\Delta \quad \text{(Formula 6)}$$

f$_c$+f$_1$' is a frequency f$_1$ of the first signal in the multi-tone signal. The formula 6 is also applicable to signals with other frequencies in the multi-tone signal (for example, f$_1$' is replaced with f$_2$'). Similarly, by changing f$_c$ and performing multi-tone-signal-based interaction, a phase value at another frequency may be obtained more quickly and used to calculate the time of flight Δ (namely, the distance D) of the signal.

It should be noted that, during multi-tone-signal-based interaction between two devices, neither an RFLO nor a digital LO can be out of lock, to ensure continuity of phases of LOs. For the digital LO, this is equivalent to that a signal A*e$^{j*2\pi*f_i*t}$ of the digital LO keeps operating continuously.

It should be further noted that only a zero-intermediate-frequency (zero IF) receiver implementation is considered in the foregoing descriptions. To be specific, a signal received by an antenna is directly converted into a baseband signal through down conversion by an RFLO. This embodiment is applicable to a low-intermediate-frequency (low IF) implementation. To be specific, a signal received by an antenna is first converted into a low-intermediate-frequency (for example, 2 MHz) signal through down conversion by an RFLO, and then the low-intermediate-frequency signal is converted into a baseband signal through down conversion again (for example, through one digital LO).

Figure 14:
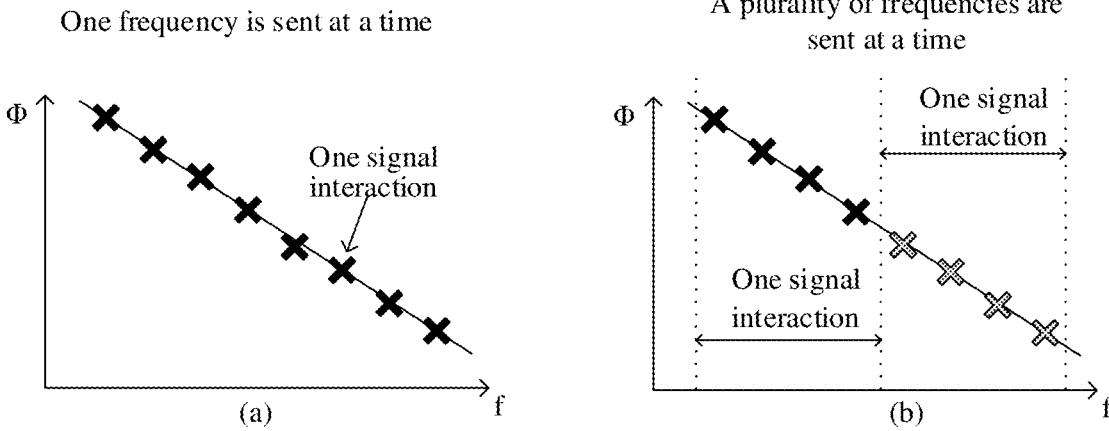
FIG. 14 is a diagram of comparison between diagrams of example relationships between a signal phase and a frequency according to an embodiment of this application.

In this embodiment, two devices send multi-tone signals to each other and measure phase values, and a distance is estimated based on a slope of phase values at a plurality of frequencies changing with frequencies. FIG. 14 is an example diagram of comparison between diagrams of relationships between a signal phase and a frequency according to an embodiment of this application. (a) in FIG. 14 is a diagram of a relationship between a signal phase and a frequency in the conventional technology. In the figure, because a carrier signal (namely, a single-frequency signal) is used for interaction in a multi-frequency phase-based ranging technology in the conventional technology, a quantity of times of signal interaction between devices is excessively large, and power consumption of the devices is quite high. For a mobile device, high power consumption leads to shorter usage time of the device. In addition, positioning time is long, and ranging takes quite a long time. This means a quite low refresh rate of ranging and positioning. If a device moves, a location obtained through positioning may be inconsistent with a real location. In addition, the difficulty of coexistent scheduling on a device increases. For a device (for example, a mobile phone) on which a plurality of wireless technologies coexists, the wireless technologies are usually scheduled in a coexistent manner through TDMA. If one of the wireless technologies takes excessive time, sending/receiving occasions of other wireless technologies are reduced. In this embodiment, (b) in FIG. 14 is a diagram of a relationship between a signal phase and a frequency according to an embodiment of this application. In the figure, two devices interact with each other by using a multi-tone signal, so that phase measurement for a plurality of frequencies can be implemented through one round of interaction. Specifically, in this embodiment, an existing carrier-signal-based (namely, single-frequency-signal-based) interaction mode is replaced with a multi-tone-signal-based interaction mode, so that a quantity of times of signal interaction for ranging can be reduced. For example, if a quantity of frequencies in a multi-tone signal is N, in this embodiment, a quantity of times of signal interaction can be reduced to 1/N of a quantity of times in a conventional method. In this way, power consumption of devices is reduced, and a distance between devices can be determined within a shorter time, so that accuracy of ranging during movement of a device is improved.

Figure 15:
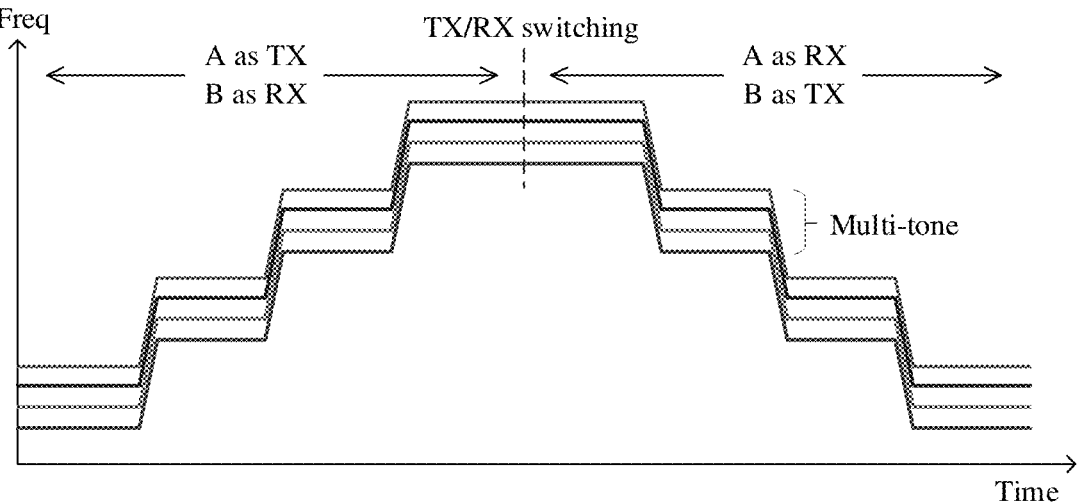
FIG. 15 is a diagram of an example multi-tone-signal-based interaction mode according to an embodiment of this application.

To obtain a distance between devices more quickly, an embodiment of this application provides a phase-based ranging method based on interaction through a plurality of multi-tone signals. Detailed descriptions are as follows:

In a possible implementation, the method further includes: The second transceiver sends L first multi-tone signals to the first transceiver to obtain L first phase value sequences, where L is an integer greater than 1, and N first frequencies corresponding to each of the L first multi-tone signals are different from each other; and receives L second multi-tone signals sent by the first transceiver to obtain L second phase value sequences, where the L first phase shift value sequences, together with the L second phase shift value sequences, are used to calculate the distance between the first transceiver and the second transceiver. For example, FIG. 15 is a diagram of an example multi-tone signal-based interaction mode according to an embodiment of this application. In the figure, a device A sends a multi-tone signal (including four frequencies) and periodically changes a frequency (indicated by a step shape in the figure) of an RFLO, a frequency of a digital LO remains unchanged, and the digital LO keeps operating. A device B adjusts a frequency of an RFLO in a same frequency hopping manner, a frequency of a digital LO remains unchanged, and the digital LO keeps operating. At each frequency of the RFLO, the device B receives a plurality of multi-tone signals and measures a phase at each frequency in the multi-tone signals. After roles of the two devices are exchanged, the device B adjusts a frequency of the RFLO in a reverse frequency hopping manner and sends a multi-tone signal, a frequency of the digital LO remains unchanged, and the digital LO keeps operating. The device A adjusts a frequency of the RFLO in a same frequency hopping manner as that of the device B, a frequency of the digital LO of A remains unchanged, and the digital LO keeps operating. For each frequency of the RFLO, the device A receives a plurality of multi-tone signals and measures a phase at each frequency in the multi-tone signals. During an entire measurement period, PLLs of the RFLOs of the two devices are not out of lock (to be specific, continuity of phases is ensured), and the digital LOs also keep operating with frequencies unchanged. Phase measurement values of the device A and the device B at a same frequency are added up, and then a distance is calculated more quickly based on a slope of a sum of phases changing with a frequency.

It should be noted that N single-frequency signals are used during first signal interaction, and then frequency hopping is performed, and second signal interaction may also be performed by using a multi-tone signal (including a plurality of single-frequency signals). In this example, in a scenario in which a plurality of multi-tone signals is sent, a distance may be calculated in three manners: (1) A distance between devices is calculated based on a plurality of phase values obtained through first signal interaction. For example, a "phase and frequency" slope is calculated to obtain the distance. (2) A distance value may alternatively be calculated based on a phase value, obtained through second signal interaction, of another single-frequency signal. (3) A distance value is calculated based on phase values obtained through two rounds of signal interaction. An obtained distance is more accurate than that obtained in the foregoing two methods.

Figure 16:
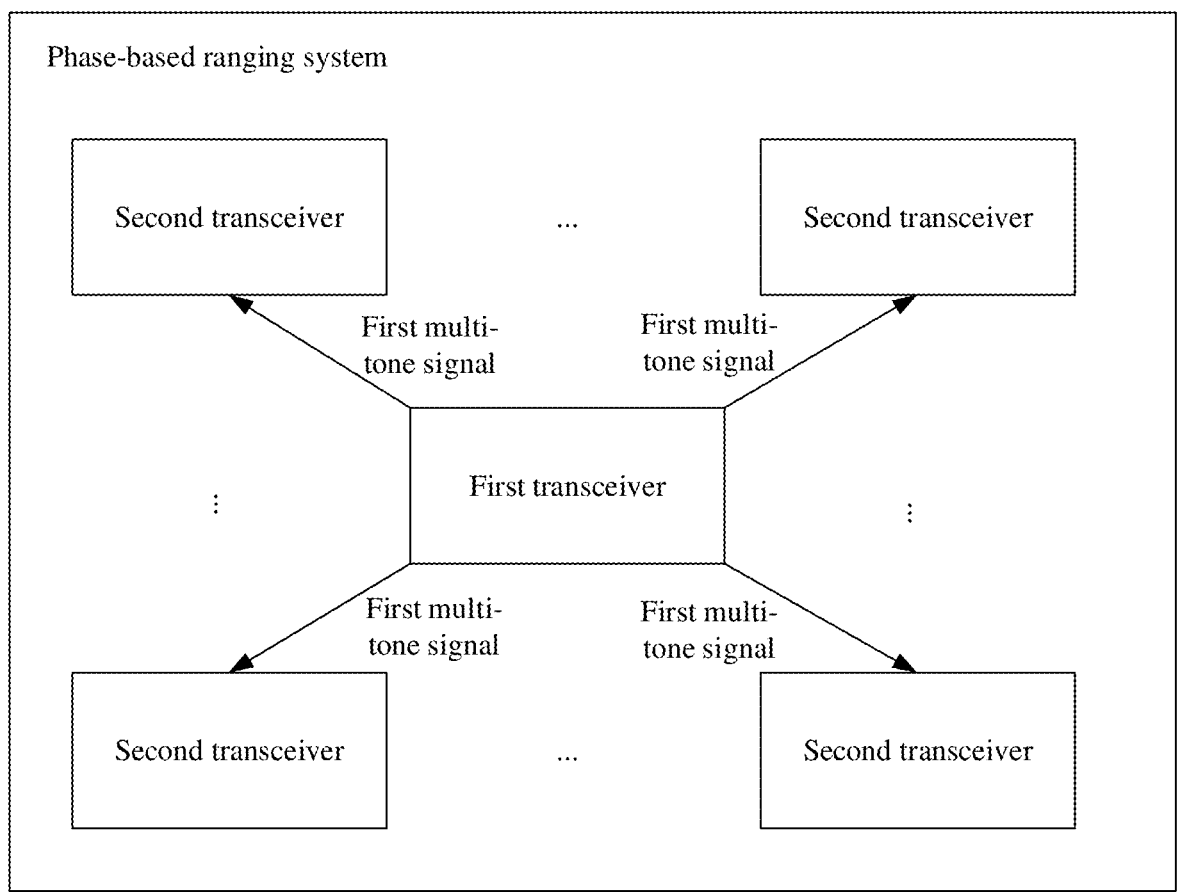
FIG. 16 is a diagram of an example phase-based ranging system according to an embodiment of this application.

FIG. 16 is a diagram of an example phase-based ranging system according to an embodiment of this application. The following describes the phase-based ranging method in embodiments of this application from a perspective of interaction between a first transceiver (which may be the device A in FIG. 1A) and M second transceivers (which may be the device B in FIG. 1A) with reference to FIG. 16.

The first transceiver is configured to send a first multi-tone signal to M second transceivers, where the first multi-tone signal includes N single-frequency signals, the N first single-frequency signals are signals obtained through negotiation between the first transceiver and the M second transceivers, and N and M are integers greater than 1.

Each of the M second transceivers is configured to: perform down conversion on the first multi-tone signal based on each of the N first single-frequency signals to obtain N direct current (DC) signals, where each first single-frequency signal corresponds to one DC signal; and measure a first phase of each of the N DC signals to obtain a first phase value sequence, where the first phase includes a phase shift value generated during transmission of a first single-frequency signal corresponding to each DC signal from the second transceiver to the first transceiver, and the first phase value sequence includes the first phase of each of the N DC signals.

A computing device is configured to calculate a distance between the first transceiver and each second transceiver based on each of the M first phase value sequences.

Figure 17:
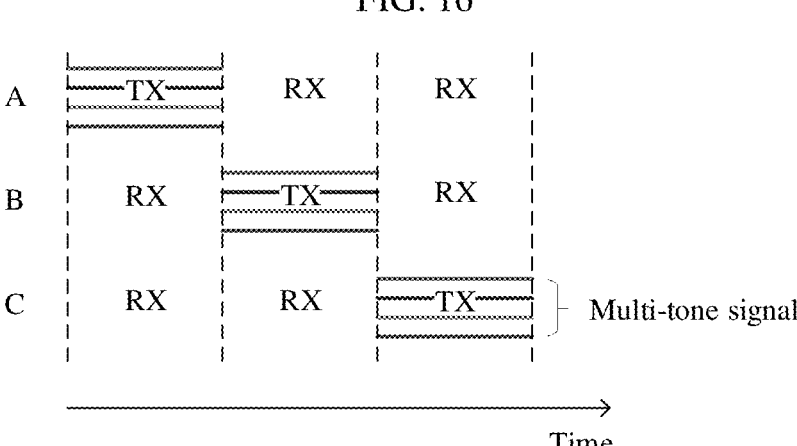
FIG. 17 is an example diagram of many-to-many phase-based ranging according to an embodiment of this application.

A scenario of one-to-one ranging between two devices is described in the foregoing embodiments (to be specific, the embodiments described before FIG. 16). During actual use, there may also be a scenario of mutual ranging between a plurality of devices (namely, many-to-many ranging). In many-to-many ranging, devices may be enabled to send multi-tone signals in turn based on a broadcast attribute of a radio signal. When a device sends a signal, other devices simultaneously receive the signal and measure a phase at each frequency in the multi-tone signal. During interaction between devices, RFLOs of the devices are not out of lock, and then the devices switch to another frequency to continue to perform similar phase measurement. For a detailed phase-based ranging process, refer to the descriptions of steps S301 to S308. It should be noted that, in a many-to-many measurement scenario, if one-way ranging is used, it needs to be ensured that an initial phase of a first transceiver is the same as initial phases of other second transceivers. Compared with one-to-one ranging performed between devices in turn, in the many-to-many ranging mode, a quantity of times of signal transmission can be reduced. For example, FIG. 17 is an example diagram of many-to-many phase-based ranging according to an embodiment of this application. When three devices in the figure perform ranging, a quantity of times of signal transmission can be reduced from six rounds of interaction in one-to-one ranging to three rounds of interaction in the many-to-many ranging mode.

The foregoing describes the method in embodiments of this application in detail. The following provides a related apparatus in embodiments of this application.

Figures 18, 19:
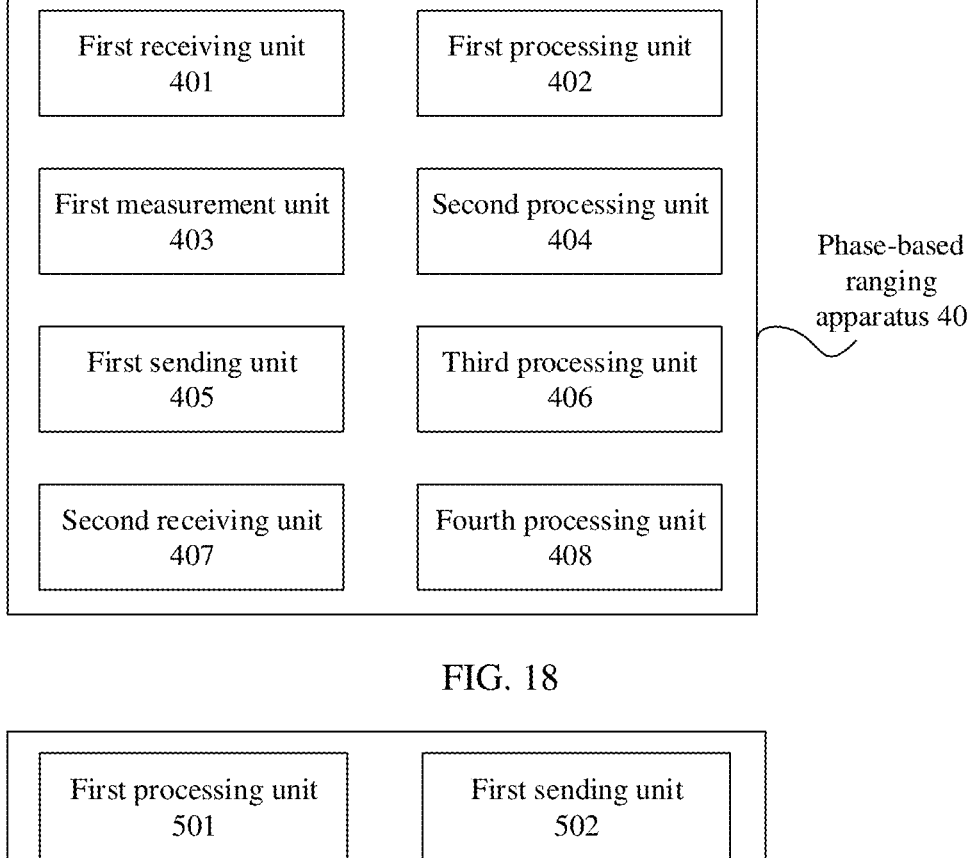
FIG. 18 is a diagram of an example first phase-based ranging apparatus according to an embodiment of this application.
FIG. 19 is a diagram of an example second phase-based ranging apparatus according to an embodiment of this application.

FIG. 18 is a diagram of an example first phase-based ranging apparatus according to an embodiment of this application. The first phase-based ranging apparatus 40 may include a first receiving unit 401, a first processing unit 402, a first measurement unit 403, a second processing unit 404, a first sending unit 405, a third processing unit 406, a second receiving unit 407, and a fourth processing unit 408. The modules are described in detail below.

The first receiving unit 401 is configured to receive a first multi-tone signal sent by a second phase-based ranging apparatus, where the first multi-tone signal includes N first single-frequency signals, the N first single-frequency signals are signals obtained through negotiation between the first phase-based ranging apparatus and the second phase-based ranging apparatus, and N is an integer greater than 1.

The first processing unit 402 is configured to perform down conversion on the first multi-tone signal based on each of the N first single-frequency signals to obtain N direct current (DC) signals, where each first single-frequency signal corresponds to one DC signal.

The first measurement unit 403 is configured to measure a first phase of each of the N DC signals to obtain a first phase value sequence, where the first phase includes a phase shift value generated during transmission of a first single-frequency signal corresponding to each DC signal from the second phase-based ranging apparatus to the first phase-based ranging apparatus, the first phase value sequence includes the first phase of each of the N DC signals, and the first phase value sequence is used to calculate a distance between the first phase-based ranging apparatus and the second phase-based ranging apparatus.

In a possible implementation, the apparatus further includes: the second processing unit 404, configured to generate a second multi-tone signal based on the N first single-frequency signals; and the first sending unit 405, configured to send the second multi-tone signal to the second phase-based ranging apparatus, where the second multi-tone signal is used by the second phase-based ranging apparatus to obtain a second phase value sequence, the second phase value sequence includes a phase shift value generated during transmission of each of the N first single-frequency signals from the first phase-based ranging apparatus to the second phase-based ranging apparatus, and the first phase value sequence, together with the second phase value sequence, is used to calculate the distance between the first phase-based ranging apparatus and the second phase-based ranging apparatus.

In a possible implementation, the first processing unit 402 is further configured to: generate N first radio frequency local oscillator signals based on N first frequencies corresponding to the N first single-frequency signals, where each first radio frequency local oscillator signal corresponds to one first frequency; and perform down conversion on the first multi-tone signal based on each of the N first radio frequency local oscillator signals to obtain the N DC signals.

In a possible implementation, the first processing unit 402 is further configured to: generate a second radio frequency local oscillator signal and N first digital local oscillator signals based on N first frequencies corresponding to the N first single-frequency signals, where a sum of N second frequencies corresponding to the N first digital local oscillator signals and a preset frequency corresponding to the second radio frequency local oscillator signal is equal to the N first frequencies; and perform down conversion on the first multi-tone signal based on the second radio frequency local oscillator signal and the N first digital local oscillator signals to obtain the N DC signals.

In a possible implementation, the first processing unit 402 is further configured to: perform down conversion on the first multi-tone signal based on the second radio frequency local oscillator signal to obtain a first baseband signal, where the first baseband signal is a signal obtained by performing spectrum shifting on the first multi-tone signal based on the preset frequency; and perform digital down conversion on the first baseband signal based on each of the N first digital local oscillator signals to obtain the N DC signals.

In a possible implementation, the second processing unit 404 is further configured to add up the N first digital local oscillator signals to obtain a second baseband signal, and perform up conversion on the second baseband signal based on the second radio frequency local oscillator signal to obtain the second multi-tone signal.

In a possible implementation, the apparatus further includes the third processing unit 406, configured to determine time of flight of a signal between the first phase-based ranging apparatus and the second phase-based ranging apparatus based on the first phase value sequence and the second phase value sequence. The third processing unit 406 is further configured to determine the distance between the first phase-based ranging apparatus and the second phase-based ranging apparatus based on the time of flight.

In a possible implementation, the apparatus further includes: the second receiving unit 407, configured to receive a carrier signal sent by the second phase-based ranging apparatus, where the carrier signal is a single-frequency signal; and the fourth processing unit 408, configured to determine a frequency deviation between the first phase-based ranging apparatus and the second phase-based ranging apparatus based on the carrier signal, where the frequency deviation is used to calibrate a frequency offset between the first phase-based ranging apparatus and the second phase-based ranging apparatus.

It should be noted that, for functions of the functional units in the first phase-based ranging apparatus 40 described in this embodiment, reference may be made to related descriptions of the steps performed by the first transceiver in the method embodiment in FIG. 3.

FIG. 19 is a diagram of an example second phase-based ranging apparatus according to an embodiment of this application. The second phase-based ranging apparatus 50 may include a first processing unit 501, a first sending unit 502, a first receiving unit 503, a second processing unit 504, a second sending unit 505, and a second receiving unit 506. The modules are described in detail below.

The first processing unit 501 is configured to generate a first multi-tone signal based on N first single-frequency signals, where the N first single-frequency signals are signals obtained through negotiation between a first transceiver and the second transceiver, and N is an integer greater than 1.

The first sending unit 502 is configured to send the first multi-tone signal to the first transceiver, where the first multi-tone signal is used by the first transceiver to obtain a first phase value sequence, the first phase value sequence includes a phase shift value generated during transmission of each of the N first single-frequency signals from the second transceiver to the first transceiver, and the first phase value sequence is used to calculate a distance between the first transceiver and the second transceiver.

In a possible implementation, the first processing unit 501 is further configured to: generate a first radio frequency local oscillator signal and N first digital local oscillator signals based on N first frequencies corresponding to the N first single-frequency signals, where a sum of N second frequencies corresponding to the N first digital local oscillator signals and a preset frequency corresponding to the first radio frequency local oscillator signal is equal to the N first frequencies; add up the N first digital local oscillator signals to obtain a first baseband signal; and perform up conversion on the first baseband signal based on the first radio frequency local oscillator signal to obtain the first multi-tone signal.

In a possible implementation, the apparatus further includes: the first receiving unit 503, configured to receive a second multi-tone signal sent by the first transceiver, where the second multi-tone signal includes the N first single-frequency signals; the second processing unit 504, configured to perform down conversion on the second multi-tone signal based on each of the N first single-frequency signals to obtain N direct current (DC) signals, where each first single-frequency signal corresponds to one DC signal; and a first measurement unit, configured to measure a second phase of each of the N DC signals to obtain a second phase value sequence, where the second phase includes a phase shift value generated during transmission of a first single-frequency signal corresponding to each DC signal from the first transceiver to the second transceiver, the second phase value sequence includes the second phase of each of the N DC signals, and the first phase value sequence, together with the second phase value sequence, is used to calculate the distance between the first transceiver and the second transceiver.

In a possible implementation, the apparatus further includes: the second sending unit 505, configured to send L first multi-tone signals to the first transceiver to obtain L first phase value sequences, where L is an integer greater than 1, and N first frequencies corresponding to each of the L first multi-tone signals are different from each other; and the second receiving unit 506, configured to receive L second multi-tone signals sent by the first transceiver to obtain L second phase value sequences, where the L first phase shift value sequences, together with the L second phase shift value sequences, are used to calculate the distance between the first transceiver and the second transceiver.

It should be noted that, for functions of the functional units in the phase-based ranging apparatus 50 described in this embodiment, reference may be made to related descriptions of the steps performed by the second transceiver in the method embodiment in FIG. 3.

Figures 20, 21:
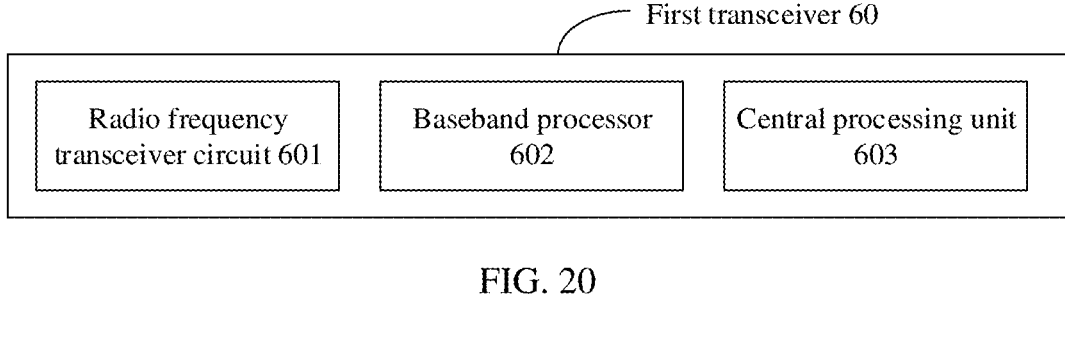
FIG. 20 is an apparatus diagram of an example first transceiver according to an embodiment of this application.
FIG. 21 is an apparatus diagram of an example second transceiver according to an embodiment of this application.

FIG. 20 is an apparatus diagram of an example first transceiver according to an embodiment of this application. The first transceiver 60 may include a radio frequency transceiver circuit 601, a baseband processor 602, and a central processing unit 603. The modules are described in detail below.

The radio frequency transceiver circuit 601 is configured to receive a first multi-tone signal sent by a second transceiver, where the first multi-tone signal includes N first single-frequency signals, the N first single-frequency signals are signals obtained through negotiation between the first transceiver and the second transceiver, and N is an integer greater than 1.

The baseband processor 602 is configured to perform down conversion on the first multi-tone signal based on each of the N first single-frequency signals to obtain N direct current (DC) signals, where each first single-frequency signal corresponds to one DC signal.

The baseband processor 602 is further configured to measure a first phase of each of the N DC signals to obtain a first phase value sequence, where the first phase includes a phase shift value generated during transmission of a first single-frequency signal corresponding to each DC signal from the second transceiver to the first transceiver, the first phase value sequence includes the first phase of each of the N DC signals, and the first phase value sequence is used to calculate a distance between the first transceiver and the second transceiver.

In a possible implementation, the baseband processor 602 is further configured to generate a second multi-tone signal based on the N first single-frequency signals; and the radio frequency transceiver circuit 601 is further configured to send the second multi-tone signal to the second transceiver, where the second multi-tone signal is used by the second transceiver to obtain a second phase value sequence, the second phase value sequence includes a phase shift value generated during transmission of each of the N first single-frequency signals from the first transceiver to the second transceiver, and the first phase value sequence, together with the second phase value sequence, is used to calculate the distance between the first transceiver and the second transceiver.

In a possible implementation, the baseband processor 602 is further configured to: generate N first radio frequency local oscillator signals based on N first frequencies corresponding to the N first single-frequency signals, where each first radio frequency local oscillator signal corresponds to one first frequency; and perform down conversion on the first multi-tone signal based on each of the N first radio frequency local oscillator signals to obtain the N DC signals.

In a possible implementation, the baseband processor 602 is further configured to: generate a second radio frequency local oscillator signal and N first digital local oscillator signals based on N first frequencies corresponding to the N first single-frequency signals, where a sum of N second frequencies corresponding to the N first digital local oscillator signals and a preset frequency corresponding to the second radio frequency local oscillator signal is equal to the N first frequencies; and perform down conversion on the first multi-tone signal based on the second radio frequency local oscillator signal and the N first digital local oscillator signals to obtain the N DC signals.

In a possible implementation, the baseband processor 602 is further configured to: perform down conversion on the first multi-tone signal based on the second radio frequency local oscillator signal to obtain a first baseband signal, where the first baseband signal is a signal obtained by performing spectrum shifting on the first multi-tone signal based on the preset frequency; and perform digital down conversion on the first baseband signal based on each of the N first digital local oscillator signals to obtain the N DC signals.

In a possible implementation, the baseband processor 602 is further configured to add up the N first digital local oscillator signals to obtain a second baseband signal, and perform up conversion on the second baseband signal based on the second radio frequency local oscillator signal to obtain the second multi-tone signal.

In a possible implementation, the apparatus further includes the central processing unit 603, configured to determine time of flight of a signal between the first transceiver and the second transceiver based on the first phase value sequence and the second phase value sequence, and determine the distance between the first transceiver and the second transceiver based on the time of flight.

In a possible implementation, the radio frequency transceiver circuit 601 is further configured to receive a carrier signal sent by the second transceiver, where the carrier signal is a single-frequency signal; and the baseband processor 602 is further configured to determine a frequency deviation between the first transceiver and the second transceiver based on the carrier signal, where the frequency deviation is used to calibrate a frequency offset between the first transceiver and the second transceiver.

It should be noted that, for functions of the functional units in the first transceiver 60 described in this embodiment, reference may be made to related descriptions of the steps performed by the first transceiver in the method embodiment in FIG. 3.

FIG. 21 is an apparatus diagram of an example second transceiver according to an embodiment of this application. The second transceiver 70 may include a radio frequency transceiver circuit 701 and a baseband processor 702. The modules are described in detail below.

The baseband processor 702 is configured to generate a first multi-tone signal based on N first single-frequency signals, where the N first single-frequency signals are signals obtained through negotiation between a first transceiver and the second transceiver, and N is an integer greater than 1.

The radio frequency transceiver circuit 701 is configured to send the first multi-tone signal to the first transceiver, where the first multi-tone signal is used by the first transceiver to obtain a first phase value sequence, the first phase value sequence includes a phase shift value generated during transmission of each of the N first single-frequency signals from the second transceiver to the first transceiver, and the first phase value sequence is used to calculate a distance between the first transceiver and the second transceiver.

In a possible implementation, the baseband processor 702 is further configured to: generate a first radio frequency local oscillator signal and N first digital local oscillator signals based on N first frequencies corresponding to the N first single-frequency signals, where a sum of N second frequencies corresponding to the N first digital local oscillator signals and a preset frequency corresponding to the first radio frequency local oscillator signal is equal to the N first frequencies; add up the N first digital local oscillator signals to obtain a first baseband signal; and perform up conversion on the first baseband signal based on the first radio frequency local oscillator signal to obtain the first multi-tone signal.

In a possible implementation, the radio frequency transceiver circuit 701 is further configured to receive a second multi-tone signal sent by the first transceiver, where the second multi-tone signal includes the N first single-frequency signals; the baseband processor 702 is further configured to perform down conversion on the second multi-tone signal based on each of the N first single-frequency signals to obtain N direct current (DC) signals, where each first single-frequency signal corresponds to one DC signal; and the baseband processor 702 is further configured to measure a second phase of each of the N DC signals to obtain a second phase value sequence, where the second phase includes a phase shift value generated during transmission of a first single-frequency signal corresponding to each DC signal from the first transceiver to the second transceiver, the second phase value sequence includes the second phase of each of the N DC signals, and the first phase value sequence, together with the second phase value sequence, is used to calculate the distance between the first transceiver and the second transceiver.

In a possible implementation, the radio frequency transceiver circuit 701 is further configured to: send L first multi-tone signals to the first transceiver to obtain L first phase value sequences, where N first frequencies corresponding to each of the L first multi-tone signals are different from each other, and L is an integer greater than 1; and receive L second multi-tone signals sent by the first transceiver to obtain L second phase value sequences, where the L first phase shift value sequences, together with the L second phase shift value sequences, are used to calculate the distance between the first transceiver and the second transceiver.

It should be noted that, for functions of the functional units in the second transceiver 70 described in this embodiment, reference may be made to related descriptions of the steps performed by the second transceiver in the method embodiment in FIG. 3.

An embodiment of this application provides an electronic device, including a processor, a memory, and a communication interface. The memory is configured to store information transmission program code. The processor is configured to invoke the phase-based ranging method program code to perform the method according to any one of the foregoing implementations in which an execution entity is the first transceiver.

An embodiment of this application provides an electronic device, including a processor, a memory, and a communication interface. The memory is configured to store information transmission program code. The processor is configured to invoke the phase-based ranging method program code to perform the method according to any one of the foregoing implementations in which an execution entity is the second transceiver.

This application provides a chip system. The chip system includes at least one processor, a memory, and an interface circuit. The memory, the interface circuit, and the at least one processor are interconnected through a line. The at least one memory stores instructions. When the instructions are executed by the processor, the method according to any one of the foregoing implementations in which an execution entity is the first transceiver is implemented.

This application provides a chip system. The chip system includes at least one processor, a memory, and an interface circuit. The memory, the interface circuit, and the at least one processor are interconnected through a line. The at least one memory stores instructions. When the instructions are executed by the processor, the method according to any one of the foregoing implementations in which an execution entity is the second transceiver is implemented.

An embodiment of this application provides a computer storage medium. The computer storage medium stores a computer program. When the computer program is executed by a processor, the method according to any one of the foregoing implementations in which an execution entity is the first transceiver is implemented.

An embodiment of this application provides a computer storage medium. The computer storage medium stores a computer program. When the computer program is executed by a processor, the method according to any one of the foregoing implementations in which an execution entity is the second transceiver is implemented.

This application provides a computer program. The computer program includes instructions. When the computer program is executed by a computer, the computer is enabled to perform the method according to any one of the foregoing implementations in which an execution entity is the first transceiver.

This application provides a computer program. The computer program includes instructions. When the computer program is executed by a computer, the computer is enabled to perform the method according to any one of the foregoing implementations in which an execution entity is the second transceiver.

In the foregoing embodiments, the descriptions in the embodiments have respective focuses. For a part that is not described in detail in an embodiment, refer to related descriptions in other embodiments.

It should be noted that, for ease of description, the foregoing method embodiments are described as a series of combinations of actions. However, persons skilled in the art should be aware that this application is not limited to the described order of the actions, because some steps may be performed in another order or simultaneously according to this application. In addition, persons skilled in the art should also be aware that embodiments described in this specification are all example embodiments, and the described actions and modules are not necessarily required for this application.

In several embodiments provided in this application, it should be understood that the disclosed apparatuses may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the shown or discussed mutual couplings, direct couplings, or communication connections may be implemented through some interfaces. The indirect couplings or communication connections between the apparatuses or units may be implemented in electrical or another form.

The units described as separate parts may or may not be physically separate, and parts shown as units may or may not be physical units, to be specific, may be located in one place, or may be distributed on a plurality of network units. Some or all of the units may be selected according to actual requirements to achieve objectives of solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or a part contributing to the conventional technology, or all or some of the technical solutions may be implemented in a form of a software product. The computer software product is stored in a storage medium and includes several instructions for instructing a computer device (which may be a personal computer, a server, a network device, or the like, and may be a processor in a computer device) to perform all or some of the steps of the methods described in embodiments of this application. The storage medium may include any medium that can store program code, for example, a USB flash drive, a removable hard disk, a magnetic disk, an optical disc, a read-only memory (ROM for short), or a random access memory (RAM for short).

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

The invention claimed is:

1. An apparatus, which is a first transceiver or included in the first transceiver, comprising at least one processor; and
   a memory coupled to the at least one processor, wherein the memory is configured to store a computer program, and
   the at least one processor is configured to execute the computer program stored in the memory, to cause the apparatus to perform operations, comprising:
   receiving a first multi-tone signal sent by a second transceiver, wherein the first multi-tone signal comprises N first single-frequency signals, the N first single-frequency signals are obtained through negotiation between the first transceiver and the second transceiver, and N is an integer greater than 1;
   performing down conversion on the first multi-tone signal based on each of the N first single-frequency signals to obtain N direct current (DC) signals, wherein each of the N first single-frequency signals corresponds to one DC signal; and
   measuring a first phase of each of the N DC signals to obtain a first phase value sequence for calculating a distance between the first transceiver and the second transceiver, wherein the first phase comprises a phase shift value generated during transmission of a first single-frequency signal corresponding to each of the N DC signals from the second transceiver to the first transceiver, and the first phase value sequence comprises the first phase of each of the N DC signals.

2. The apparatus according to claim 1, wherein the operations further comprise:

generating a second multi-tone signal based on the N first single-frequency signals; and sending the second multi-tone signal to the second transceiver, wherein the second multi-tone signal is used by the second transceiver to obtain a second phase value sequence for calculating the distance between the first transceiver and the second transceiver, and the second phase value sequence comprises a phase shift value generated during transmission of each of the N first single-frequency signals from the first transceiver to the second transceiver.

3. The apparatus according to claim 2, wherein the operations further comprise:

determining time of flight of a signal between the first transceiver and the second transceiver based on the first phase value sequence and the second phase value sequence; and determining the distance between the first transceiver and the second transceiver based on the time of flight.

4. The apparatus according to claim 1, wherein the performing down conversion on the first multi-tone signal based on each of the N first single-frequency signals to obtain N direct current (DC) signals comprises:

generating N first radio frequency local oscillator signals based on N first frequencies corresponding to the N first single-frequency signals, wherein each of the N first radio frequency local oscillator signals corresponds to one of the N first frequencies; and performing down conversion on the first multi-tone signal based on each of the N first radio frequency local oscillator signals to obtain the N DC signals.

5. The apparatus according to claim 1, wherein the performing down conversion on the first multi-tone signal based on each of the N first single-frequency signals to obtain N first direct current (DC) signals comprises:

generating a second radio frequency local oscillator signal and N first digital local oscillator signals based on N first frequencies corresponding to the N first single-frequency signals, wherein a sum of N second frequencies corresponding to the N first digital local oscillator signals and a preset frequency corresponding to the second radio frequency local oscillator signal is equal to the N first frequencies; and performing down conversion on the first multi-tone signal based on the second radio frequency local oscillator signal and the N first digital local oscillator signals to obtain the N DC signals.

6. The apparatus according to claim 5, wherein the performing down conversion on the first multi-tone signal based on the second radio frequency local oscillator signal and the N first digital local oscillator signals to obtain the N DC signals comprises:

performing down conversion on the first multi-tone signal based on the second radio frequency local oscillator signal to obtain a first baseband signal, wherein the first baseband signal is obtained by performing spectrum shifting on the first multi-tone signal based on the preset frequency; and performing digital down conversion on the first baseband signal based on each of the N first digital local oscillator signals to obtain the N DC signals.

7. The apparatus according to claim 5, wherein the generating a second multi-tone signal based on the N first single-frequency signals comprises:

adding up the N first digital local oscillator signals to obtain a second baseband signal; and performing up conversion on the second baseband signal based on the second radio frequency local oscillator signal to obtain the second multi-tone signal.

8. The apparatus according to claim 1, wherein the operations further comprise:

performing a handshake procedure with the second transceiver to obtain, through negotiation, the N first single-frequency signals used during phase-based ranging.

9. The apparatus according to claim 1, wherein the operations further comprise:

receiving a carrier signal sent by the second transceiver, wherein the carrier signal is a single-frequency signal; and determining a frequency deviation between the first transceiver and the second transceiver based on the carrier signal, for calibrating a frequency offset between the first transceiver and the second transceiver.

10. An apparatus, which is a second transceiver or included in the second transceiver, comprising at least one processor and a memory configured to store a computer program, wherein the at least one processor is configured to execute the computer program stored in the memory, to cause the apparatus to perform operations, comprising:

generating a first multi-tone signal based on N first single-frequency signals, wherein the N first single-frequency signals are obtained through negotiation between a first transceiver and the second transceiver, and N is an integer greater than 1; and sending the first multi-tone signal to the first transceiver for obtaining a first phase value sequence for calculating a distance between the first transceiver and the second transceiver, and the first phase value sequence comprises a phase shift value generated during transmission of each of the N first single-frequency signals from the second transceiver to the first transceiver.

11. The apparatus according to claim 10, wherein the generating a first multi-tone signal based on N first single-frequency signals comprises:

generating a first radio frequency local oscillator signal and N first digital local oscillator signals based on N first frequencies corresponding to the N first single-frequency signals, wherein a sum of N second frequencies corresponding to the N first digital local oscillator signals and a preset frequency corresponding to the first radio frequency local oscillator signal is equal to the N first frequencies;

adding up the N first digital local oscillator signals to obtain a first baseband signal; and performing up conversion on the first baseband signal based on the first radio frequency local oscillator signal to obtain the first multi-tone signal.

12. The apparatus according to claim 11, wherein the operations further comprise:

sending L first multi-tone signals to the first transceiver to obtain L first phase value sequences, wherein N first frequencies corresponding to each of the L first multi-tone signals are different from each other, and L is an integer greater than 1; and receiving L second multi-tone signals sent by the first transceiver to obtain L second phase value sequences, wherein the L first phase value sequences, together with the L second phase value sequences, are used to calculate the distance between the first transceiver and the second transceiver.

13. The apparatus according to claim 10, wherein the operations further comprise:

receiving a second multi-tone signal sent by the first transceiver, wherein the second multi-tone signal comprises the N first single-frequency signals;

performing down conversion on the second multi-tone signal based on each of the N first single-frequency signals to obtain N direct current (DC) signals, wherein each of the N first single-frequency signals corresponds to one of the N DC signals; and measuring a second phase of each of the N DC signals to obtain a second phase value sequence for calculating the distance between the first transceiver and the second transceiver, wherein the second phase comprises a phase shift value generated during transmission of a first single-frequency signal corresponding to each of the N DC signals from the first transceiver to the second transceiver, and the second phase value sequence comprises the second phase of each of the N DC signals.

14. The apparatus according to claim 10, wherein higher bandwidth of interfered frequency band of a channel between the first transceiver and the second transceiver indicates a smaller quantity N of first single-frequency signals comprised in the first multi-tone signal.

15. A phase-based ranging system, comprising:

a first transceiver, configured to:

send a first multi-tone signal to M second transceivers, wherein the first multi-tone signal comprises N first single-frequency signals, the N first single-frequency signals are obtained through negotiation between the first transceiver and the M second transceivers, and N and M are integers greater than 1;

each of the M second transceivers, configured to:

perform down conversion on the first multi-tone signal based on each of the N first single-frequency signals to obtain N direct current (DC) signals, wherein each of the N first single-frequency signals corresponds to one of the N DC signals; and measure a first phase of each of the N DC signals to obtain a first phase value sequence, wherein the first phase comprises a phase shift value generated during transmission of a first single-frequency signal corresponding to the respective DC signal from the respective second transceiver to the first transceiver, and the first phase value sequence comprises the first phase of each of the N DC signals; and a computing device, configured to:

calculate a distance between the first transceiver and each of the M second transceivers based on each of M first phase value sequences.

16. The phase-based ranging system according to claim 15, wherein the performing down conversion on the first multi-tone signal based on each of the N first single-frequency signals to obtain N direct current (DC) signals comprises:

generating N first radio frequency local oscillator signals based on N first frequencies corresponding to the N first single-frequency signals, wherein each of the N first radio frequency local oscillator signals corresponds to one of the N first frequencies; and performing down conversion on the first multi-tone signal based on each of the N first radio frequency local oscillator signals to obtain the N DC signals.

17. The phase-based ranging system according to claim 15, wherein the performing down conversion on the first multi-tone signal based on each of the N first single-frequency signals to obtain N first direct current (DC) signals comprises:

generating a second radio frequency local oscillator signal and N first digital local oscillator signals based on N first frequencies corresponding to the N first single-frequency signals, wherein a sum of N second frequencies corresponding to the N first digital local oscillator signals and a preset frequency corresponding to the second radio frequency local oscillator signal is equal to the N first frequencies; and performing down conversion on the first multi-tone signal based on the second radio frequency local oscillator signal and the N first digital local oscillator signals to obtain the N DC signals.

18. The phase-based ranging system according to claim 17, wherein the performing down conversion on the first multi-tone signal based on the second radio frequency local oscillator signal and the N first digital local oscillator signals to obtain the N DC signals comprises:

performing down conversion on the first multi-tone signal based on the second radio frequency local oscillator signal to obtain a first baseband signal, wherein the first baseband signal is obtained by performing spectrum shifting on the first multi-tone signal based on the preset frequency; and performing digital down conversion on the first baseband signal based on each of the N first digital local oscillator signals to obtain the N DC signals.

19. The phase-based ranging system according to claim 17, wherein the generating a second multi-tone signal based on the N first single-frequency signals comprises:

adding up the N first digital local oscillator signals to obtain a second baseband signal; and performing up conversion on the second baseband signal based on the second radio frequency local oscillator signal to obtain the second multi-tone signal.

\* \* \* \* \*